US012431623B2

(12) United States Patent
Coutts

(10) Patent No.: US 12,431,623 B2
(45) Date of Patent: *Sep. 30, 2025

(54) ANTENNA MODULE GROUNDING FOR PHASED ARRAY ANTENNAS

(71) Applicant: Amazon Technologies, Inc., Seattle, WA (US)

(72) Inventor: Gordon Coutts, Woodinville, WA (US)

(73) Assignee: Amazon Technologies, Inc., Seattle, WA (US)

(*) Notice: Subject to any disclaimer, the term of this patent is extended or adjusted under 35 U.S.C. 154(b) by 148 days.

This patent is subject to a terminal disclaimer.

(21) Appl. No.: 18/369,691

(22) Filed: Sep. 18, 2023

(65) Prior Publication Data

US 2024/0006763 A1 Jan. 4, 2024

Related U.S. Application Data

(63) Continuation of application No. 17/240,205, filed on Apr. 26, 2021, now Pat. No. 11,843,187.

(51) Int. Cl.

| | |
|---|---|
| ***H01Q 1/42*** | (2006.01) |
| ***H01Q 5/378*** | (2015.01) |
| ***H01Q 5/385*** | (2015.01) |
| ***H01Q 5/392*** | (2015.01) |
| ***H01Q 5/42*** | (2015.01) |
| ***H01Q 9/04*** | (2006.01) |
| ***H01Q 21/06*** | (2006.01) |

(52) U.S. Cl.

CPC ............... *H01Q 5/42* (2015.01); *H01Q 5/378* (2015.01); *H01Q 5/385* (2015.01); *H01Q 5/392* (2015.01); *H01Q 9/0414* (2013.01); *H01Q 21/065* (2013.01)

(58) Field of Classification Search

CPC .......... H01Q 5/42; H01Q 5/578; H01Q 5/385; H01Q 5/392; H01Q 9/0414; H01Q 21/065

See application file for complete search history.

(56) References Cited

U.S. PATENT DOCUMENTS

| | | | |
|---|---|---|---|
| 6,114,998 | A | 9/2000 | Schefte |
| 6,211,841 | B1 | 4/2001 | Smith |
| 6,795,020 | B2 | 9/2004 | Sreenivas |
| 7,250,918 | B2 | 7/2007 | Puente Baliarda |
| 7,557,768 | B2 | 7/2009 | Baliarda |
| 10,381,736 | B2 | 8/2019 | Jung |

(Continued)

OTHER PUBLICATIONS

International Search Report and Written Opinion on application No. PCT/US2022/024905, mailed Jul. 25, 2022.

(Continued)

*Primary Examiner* — Ab Salam Alkassim, Jr.

(74) *Attorney, Agent, or Firm* — Lowenstein Sandler LLP

(57) ABSTRACT

Technologies directed to overlaid shared aperture array with improved total efficiency are described. One RF structure includes a first antenna with a first set of antenna elements disposed on a first plane of a support structure and a second antenna with a second set of antenna elements disposed on a second plane of the support structure. A set of parasitic antenna elements are disposed on the first plane. Two adjacent antenna elements, including one from the first plurality of antenna elements and another one from the plurality of parasitic antenna elements, are separated by the second distance.

20 Claims, 24 Drawing Sheets

(56) References Cited

U.S. PATENT DOCUMENTS

| | | | | |
|---|---|---|---|---|
| 11,158,948 | B2 | 10/2021 | Lee | |
| 11,462,828 | B1 | 10/2022 | Yousefi | |
| 11,843,187 | B2 * | 12/2023 | Coutts | H01Q 1/288 |
| 2005/0225498 | A1 | 10/2005 | Koparan | |
| 2009/0135078 | A1 | 5/2009 | Lindmark | |
| 2009/0224995 | A1 | 9/2009 | Puente | |
| 2010/0171675 | A1 | 7/2010 | Borja | |
| 2014/0002326 | A1 | 1/2014 | Puente | |
| 2014/0242930 | A1 | 8/2014 | Barker | |
| 2014/0368395 | A1 | 12/2014 | Dauguet | |
| 2015/0263431 | A1 | 9/2015 | Moon | |
| 2015/0318622 | A1 | 11/2015 | Pruett | |
| 2017/0222325 | A1 | 8/2017 | Sudo | |
| 2019/0013590 | A1 | 1/2019 | Rowell | |
| 2019/0020714 | A1 | 1/2019 | Lee | |
| 2019/0148839 | A1 | 5/2019 | Lin | |
| 2019/0173195 | A1 * | 6/2019 | Kim | H01Q 21/065 |
| 2019/0386393 | A1 | 12/2019 | Chiang | |
| 2020/0106158 | A1 | 4/2020 | Gomez Angulo | |
| 2020/0106183 | A1 * | 4/2020 | Fabrega Sanchez | H04B 1/0458 |
| 2020/0127387 | A1 | 4/2020 | Park | |
| 2020/0220249 | A1 * | 7/2020 | Asaf | H01Q 25/001 |
| 2020/0295437 | A1 * | 9/2020 | Ueda | H01Q 9/0407 |
| 2020/0403322 | A1 | 12/2020 | Ryu | |
| 2021/0006300 | A1 | 1/2021 | Bisiules | |
| 2021/0036428 | A1 * | 2/2021 | Ueda | H01Q 13/08 |
| 2021/0036433 | A1 * | 2/2021 | Kim | H01Q 21/08 |
| 2021/0044028 | A1 | 2/2021 | Lee | |
| 2021/0066817 | A1 | 3/2021 | Tehran | |
| 2021/0111482 | A1 | 4/2021 | Raj | |
| 2021/0126366 | A1 * | 4/2021 | Sudo | H01Q 5/28 |
| 2021/0151899 | A1 | 5/2021 | Park | |
| 2021/0305697 | A1 | 9/2021 | Chen | |
| 2021/0320413 | A1 | 10/2021 | Wu | |
| 2021/0367358 | A1 * | 11/2021 | He | H01Q 25/001 |
| 2022/0045442 | A1 | 2/2022 | Fabrega Sanchez | |
| 2022/0077586 | A1 | 3/2022 | Jeong | |
| 2022/0085502 | A1 | 3/2022 | Arai | |
| 2022/0094061 | A1 | 3/2022 | Yong | |
| 2022/0190484 | A1 | 6/2022 | Lee | |
| 2023/0028526 | A1 | 1/2023 | Kim | |
| 2023/0065251 | A1 | 3/2023 | Wayton | |
| 2023/0076013 | A1 | 3/2023 | Moallem | |
| 2023/0187848 | A1 | 6/2023 | Fabrega Sanchez | |
| 2023/0216205 | A1 | 7/2023 | Li | |
| 2023/0261381 | A1 * | 8/2023 | Hassan | H01Q 21/24 343/893 |
| 2024/0047853 | A1 * | 2/2024 | Lee | H01Q 9/0414 |
| 2024/0429611 | A1 * | 12/2024 | Aviv | H01Q 5/42 |
| 2025/0062547 | A1 * | 2/2025 | Chiang | H01Q 21/065 |

OTHER PUBLICATIONS

Mao CX, Gao S, Luo Q, Rommel T, Chu QX. Low-cost X/Ku/Ka-band dual-polarized array with shared aperture. IEEE Transactions on Antennas and Propagation. May 2, 2017;65(7):3520-7.

* cited by examiner

1300

1340

ANTENNA MODULE GROUNDING FOR PHASED ARRAY ANTENNAS

RELATED APPLICATIONS

This application is a continuation of U.S. patent application Ser. No. 17/240,205, filed Apr. 26, 2021, the entire contents of which are incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of digital media items. These electronic devices include one or more antennas to communicate with other devices wirelessly.

BRIEF DESCRIPTION OF DRAWINGS

The present inventions will be understood more fully from the detailed description given below and from the accompanying drawings of various embodiments, which, however, should not be taken to limit the present invention to the specific embodiments but are for explanation and understanding only.

DETAILED DESCRIPTION

Figure 1:
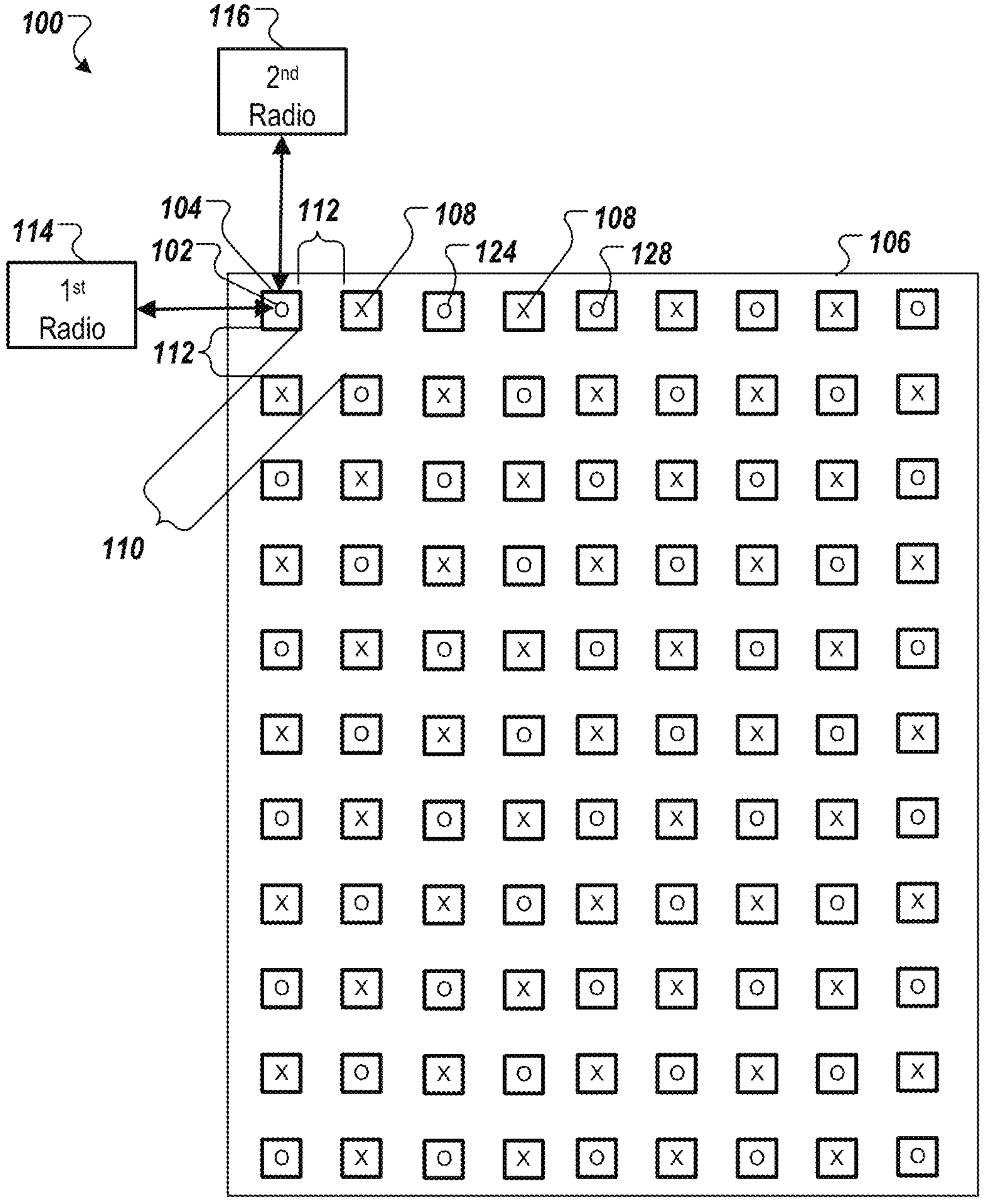
FIG. 1 illustrates an antenna structure with two overlaid phased array antennas on a support structure with parasitic antenna elements according to one embodiment.

Technologies directed to overlaid shared aperture array with improved total efficiency are described. Conventionally, wireless devices with multiple phased array antennas would have separate printed circuit boards (PCBs), each PCB including one of the multiple phased array antennas. The phased array antenna synthesizes a specified electric field (phase and amplitude) across an aperture, and the elements of the phased array antenna are spaced apart with a specified inter-element spacing value (e.g., a distance between any two elements of the phased array antenna). As a result, a wireless device with multiple phased array antennas has multiple apertures, one aperture per phased array antenna. A user terminal that communicates with a satellite using a first frequency band for downlink communications and another frequency band for uplink communications includes two separate PCBs with two different apertures. An aperture refers to an absence of materials above the phased array antenna elements that allow the antenna elements to radiate electromagnetic energy to send a signal (TX signal) to another device or receive and measure an incoming signal (receive (RX) signal) at the antenna elements. In some cases, there may be some protective material in the aperture above the antenna elements that do not affect the sending and receiving of wireless signals. The multiple apertures and the corresponding PCBs contribute to the size and cost of the wireless device.

When two antenna arrays, which operate in different frequency bands, share an aperture, the higher frequency array has closer spaced antenna elements than the lower frequency array since the size is proportional to wavelength. The spacing of antenna elements can result in under-sampling the aperture when the elements are spaced too far apart, resulting in grating lobes in the radiation pattern. The grating lobes are beams that point in undesired directions relative to the scanning array's main beam. The grating lobes may violate regulatory pattern masks when transmitting or be susceptible to interference/jamming when receiving data. One approach is to overlay the lattice arrays of antenna elements. There can be challenges when implementing overlaid lattice arrays. Overlaying the lower frequency array over the higher frequency array introduces a periodic defect in the lattice at a spacing under-sampled at the high frequency. The lattice's periodic defect causes grating lobes to appear in the radiation pattern, even if at a lower level than an under-sampled array.

It should be noted that if lower frequency elements were added to the array with a 1:1 ratio to eliminate the under-sampled lattice, the array would now be over-sampling the lower frequency array. Adding lower frequency elements to the overlaid lattices will increase the number of active components needed to drive the array. Adding lower frequency elements to the overlaid lattices will increase printed circuit board (PCB) stack-up and layout complexity, driving up cost and power consumption. Adding lower frequency elements to the overlaid lattices is impractical for a low-cost consumer product.

Aspects of the present disclosure overcome the conventional solution's deficiencies by providing parasitic antenna elements in the lower frequency lattice to reduce the grating lobe effects while maintaining good antenna performance. Parasitic antenna elements are passive elements and have no active feed. These parasitic elements are not directly connected to the feed and can increase the radiation indirectly. The lower frequency parasitic elements are designed such that currents, excited on them by the higher frequency antenna elements, are similar to what happens on the actively fed lower frequency antenna elements. The lower frequency parasitic elements have similar characteristic modes as the actively fed lower frequency antenna elements. The higher frequency elements' patterns are now similar when over an active lower frequency element and a parasitic element, resulting in significant suppression of grating lobes. As such, there are no additional active components that are needed for these added parasitic antenna elements. The lattice with parasitic elements can provide a simpler PCB stack-up and layout design, driving down cost and power consumption instead of adding additional lower frequency antenna elements to eliminate the under-sampled lattice.

Another practical consideration is that degradation in antenna efficiency with overlaid apertures can be observed. Aspects of the present disclosure overcome the deficiencies by providing a dual linearly polarized element that mitigates much of this performance degradation. The two overlaid arrays are implemented in orthogonal polarizations of the dual linearly polarized elements. This overlaid array achieves good efficiency by separating the high band and low band into orthogonal linearly polarized components using elements with good cross-polarized isolation. A meander-line polarizer can be added to achieve circular polarization with this array.

FIG. 1 illustrates an antenna structure 100 with two overlaid phased array antennas 102, 104 on a support structure 106 with parasitic antenna elements 108 according to one embodiment. A first phased array antenna 102 includes a first set of antenna elements disposed on a surface or a first plane of the support structure 106. The support structure 106 can be a circuit board, such as a PCB, or other structures upon which the antenna elements can be positioned. The first set of antenna elements is organized as a first lattice. The first lattice has a first inter-element spacing of a first distance 110 between each of the first set of antenna elements. That is, a first inter-element spacing value is equal to the first distance 110. Each of the first set of antenna elements has a first size proportional to a first wavelength corresponding to a frequency of a first frequency band. The first phased array antenna 102 can be coupled to a first radio 114 that operates in the first frequency band. The first radio 114 can include a baseband processor and radio frequency front-end (RFFE) circuitry. Alternatively, the first phased array antenna 102 can be coupled to other communication systems, such as radio frequency (RF) radio, microwave radios, or other signal sources or receivers. A second phased array antenna 104 includes a second set of antenna elements disposed on the surface or a second plane of the support structure 106. The second set of antenna elements is organized as a second lattice overlaid with the first lattice. The second lattice has a second inter-element spacing of a second distance 112 between each of the second set of antenna elements. Each of the second set of antenna elements has a second size proportional to a second wavelength corresponding to a frequency of the second frequency band, the second frequency band being higher in frequency than the first frequency band. The second phased array antenna 104 can be coupled to a second radio 116 that operates in the second frequency band. Alternatively, the first phased array antenna 102 and the second phased array antenna 104 can be coupled to a radio that operates in both the first frequency band and the second frequency band. The second distance 112 is less than the first distance 110 and the second size is less than the first size. The second lattice is rotated 45 degrees with respect to the first lattice. The second inter-element spacing of the second lattice is smaller than the first inter-element spacing. Alternatively, the second lattice can be rotated at other angle values with respect to the first lattice. In other embodiments, the first lattice can be rotated by an angle from the second lattice. As illustrated in FIG. 1, the first set of antenna elements of the first phased array antenna 102 are overlaid with some of the second set of antenna elements of the second phased array antenna 104. As described above, to eliminate the under-sampling of the first phased array antenna 102, a set of parasitic elements 108 are overlaid with the others of the second set of antenna elements of the second phased array antenna 104 as illustrated in FIG. 1. That is, the first set of antenna elements and the set of parasitic elements are overlaid with the elements of the second set of antenna elements. In at least one embodiment, two adjacent antenna elements of the first phased array antenna 102 are separated by the first distance 110, two adjacent elements of the second phased array antenna 104 are separated by the second distance 112, and an element of the first phased array antenna 102 and a parasitic element 108 are separated by the second distance 112.

As described in more detail with respect to FIGS. 3-5, the first phased array antenna 102, including the set of parasitic elements, and the second phased array antenna 104 are constructed with multiple unit cells. The unit cells can also be considered identical tiles. Each of the multiple unit cells can include some antenna elements of the first phased array antenna 102 and some antenna elements of the second phased array antenna 104. In one implementation, the unit cell includes one antenna element of the first phased array antenna 102, two of the set of parasitic antenna elements of the first phased array antenna 102, and three antenna elements of the second phased array antenna 104. Alternatively, each unit cell includes other combinations of antenna elements and parasitic elements.

In at least one embodiment, a communication system includes a first antenna and a second antenna overlaid in the same aperture. The first antenna includes a first set of antenna elements disposed on a first plane of the support structure 106. A second antenna includes a second set of antenna elements disposed on a second plane of the support structure 106. Two adjacent antenna elements of the first set of antenna elements are separated by a first distance 110. Two adjacent elements of the second set of antenna elements are separated by a second distance 112 that is less than the first distance 110. A set of parasitic elements is disposed on the first plane in connection with the first set of antenna elements of the first antenna. Two adjacent antenna elements of the first set of antenna elements and parasitic antenna elements are separated by the second distance 112. In a further embodiment, the first antenna is configured to operate in a first frequency range. The second antenna is configured to operate in a second frequency range that is higher in frequency than the first frequency range. In at least one embodiment, the first frequency range is between approximately 17.7 GHz and approximately 19.3 GHz. In at least one embodiment, the second frequency range is between approximately 28.5 GHz and approximately 29.1 GHz. Each of the first set of antenna elements and the set of parasitic antenna elements has a first size and each of the second set of antenna elements has a second size that is smaller than the first size. In at least one embodiment, the first size is proportional to a wavelength corresponding to the first frequency range, and the second size is proportional to a wavelength corresponding to the second frequency range. In at least one embodiment, the first distance 110 is approximately $\sqrt{2}$ times (e.g., 1.5 times) greater than the second distance 112. In another embodiment, the first distance 110 is approximately $\sqrt{3}$ times greater than the second distance 112.

As illustrated in FIG. 1, the first set of antenna elements (e.g., 102) are organized as a first lattice and the second set of antenna elements (e.g., 104) are organized as a second lattice, where the second lattice is rotated 45 degrees with respect to the first lattice. In another embodiment, the first set of antenna elements (e.g., 102) are organized as a first lattice and the second set of antenna elements (e.g., 104) are organized as a second lattice, where the second lattice is rotated 30 degrees with respect to the first lattice. Alternatively, the second lattice is rotated by another angle value with respect to the first lattice.

In at least one embodiment, the first antenna and the second antenna are constructed with multiple unit cells, each of the unit cells comprising one of the first set of antenna elements (e.g., 102), two of the set of parasitic antenna elements (e.g., 108), and three of the second set of antenna elements (e.g., 104). Alternatively, the unit cells can include different combinations of antenna elements and parasitic elements to make up the first and second antennas.

As illustrated in FIG. 1, the antenna elements' orientation can vary between the first phased array antenna and the second phased array antenna. Although illustrated as squares, circles, and X marks, each antenna element can have different shapes collectively or individually.

Figure 2:
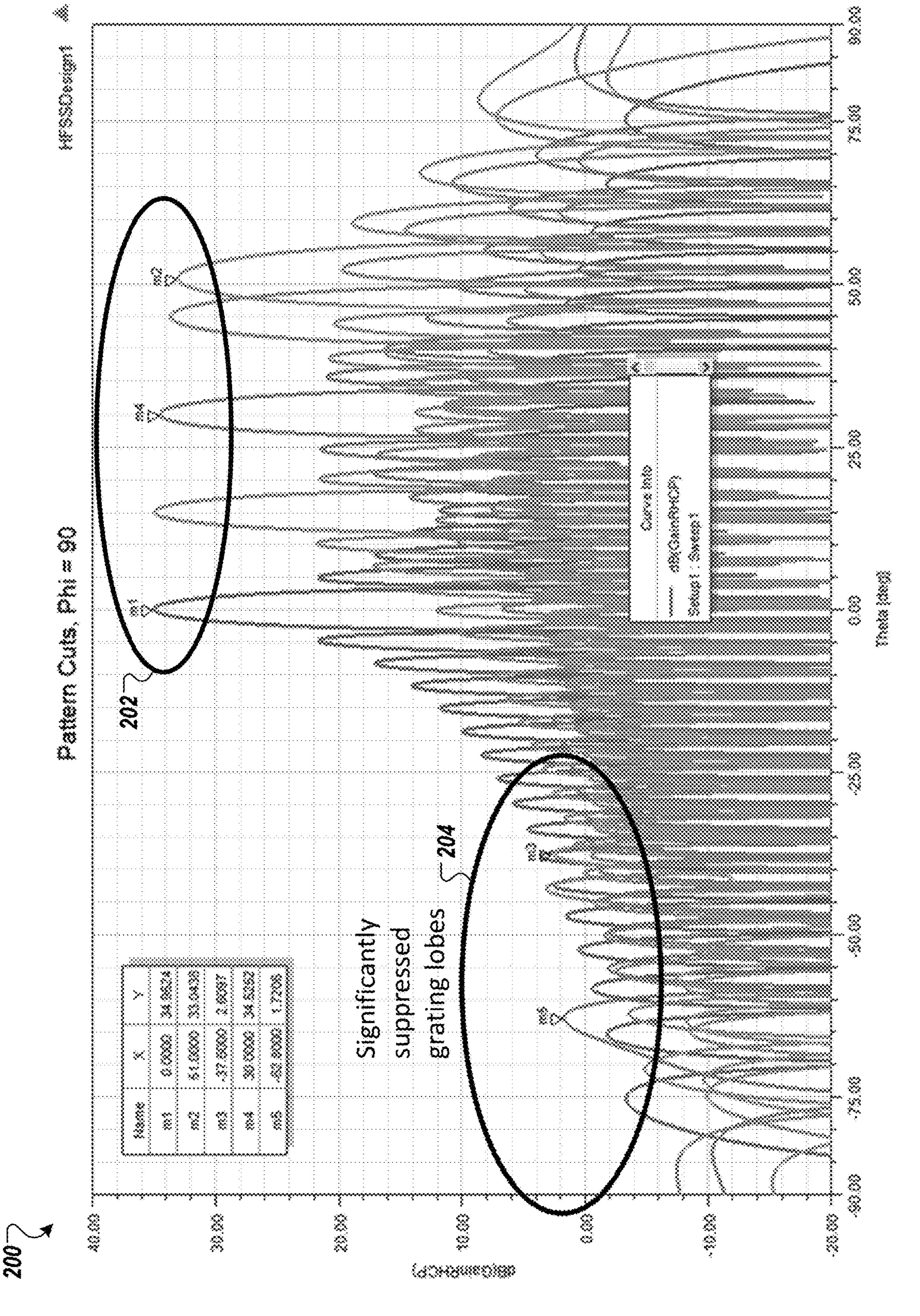
FIG. 2 is a graph illustrating a radiation pattern with a main beam and suppressed grating lobes of a first antenna array, having parasitic antenna elements overlaid on a second antenna array according to one embodiment.
Figure 3B:
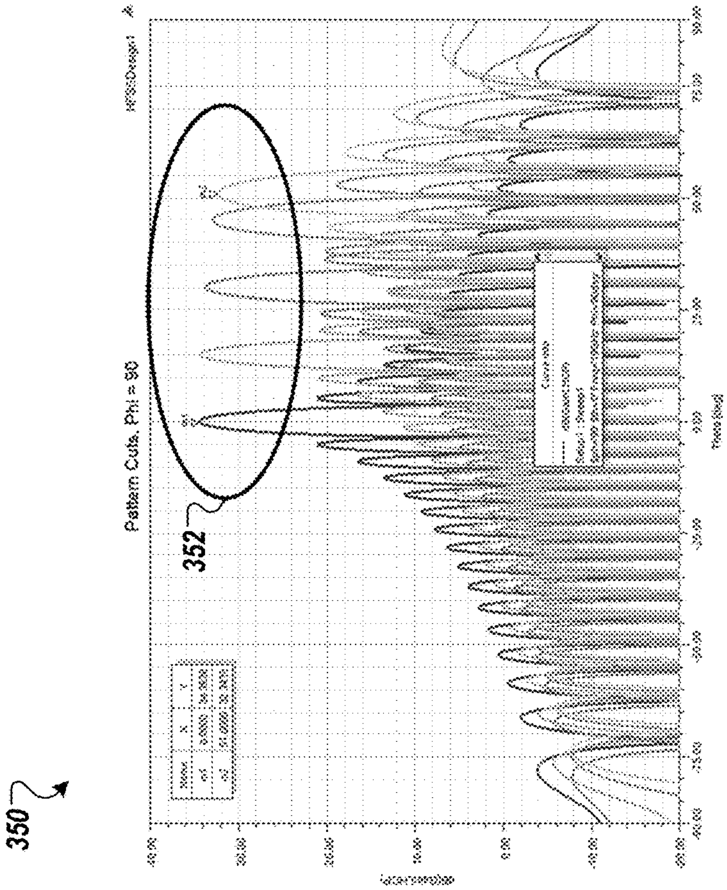
FIG. 3B illustrates a graph illustrating a radiation pattern for the antenna array with the proper spacing of FIG. 3A, according to one embodiment.

FIG. 2 is a graph illustrating a radiation pattern 200 with a main beam 202 and suppressed grating lobes 204 of a first antenna array with parasitic antenna elements overlaid on a second antenna array, according to one embodiment. The radiation pattern 200 has a cut angle, phi, equal to 90 degrees, which is relative to the x-axis and kept constant, while the angle theta, which is relative to the z-axis, is swept to create a planar cut. Theta is swept from −90 degrees to +90 degrees to produce the graph. As illustrated in FIG. 2, the radiation pattern 200 has a main beam 202 and suppressed grating lobes 204. In particular, the suppressed grating lobes are less than 5 dB (e.g., 1.7206 dB at −62.8 theta). For comparisons, FIG. 3B illustrates a graph illustrating a radiation pattern for an antenna array with proper spacing of FIG. 3A, FIG. 4B illustrates a graph illustrating a radiation pattern for an antenna array with an under-sampled aperture of FIG. 4A, and FIG. 5B illustrates a graph of a radiation pattern for overlaid lattices of FIG. 5A.

Figure 3A:
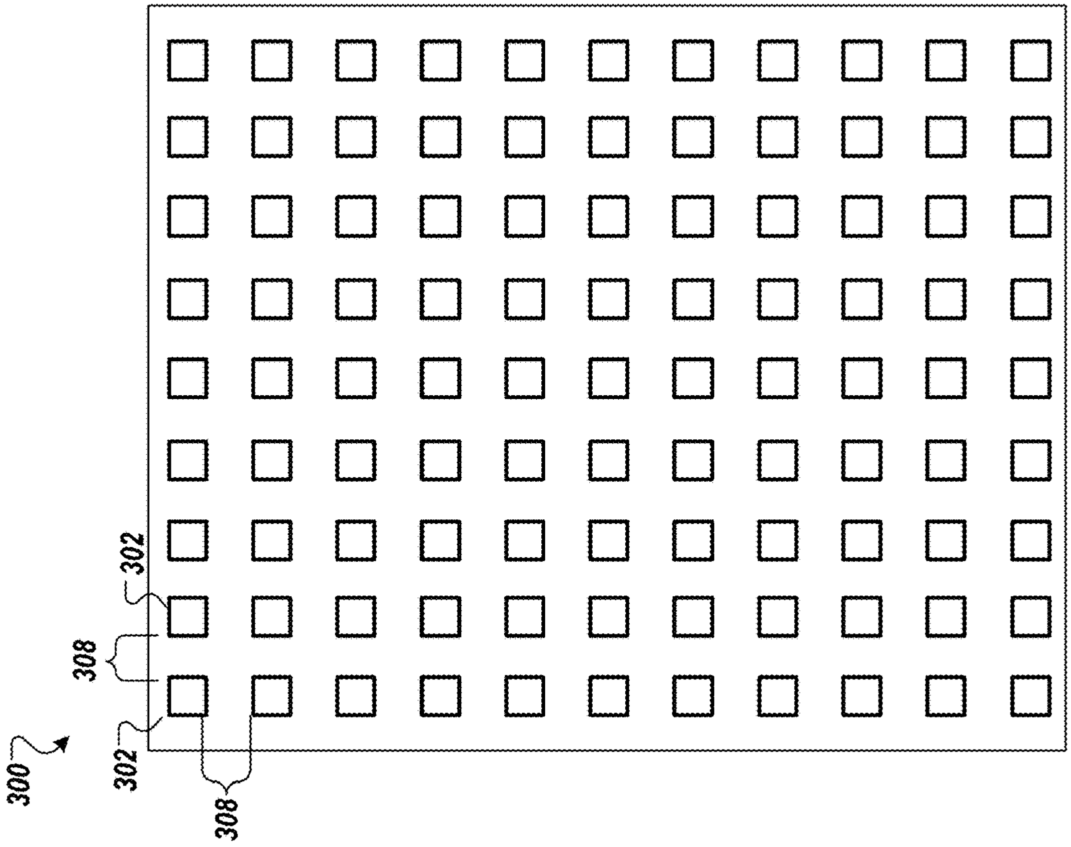
FIG. 3A illustrates an antenna array with proper array spacing according to one embodiment.
Figure 4B:
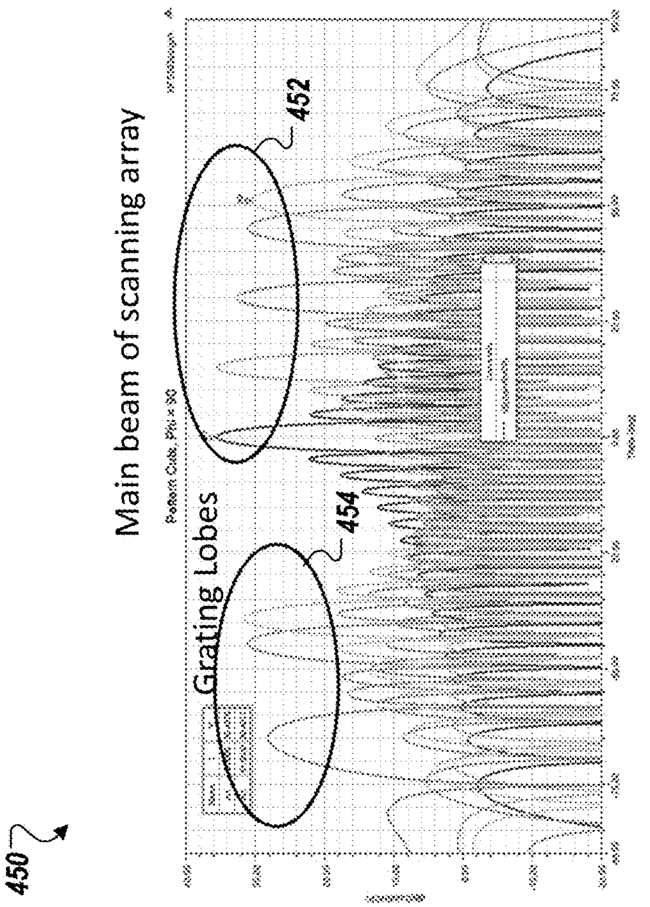
FIG. 4B illustrates a graph illustrating a radiation pattern for the antenna array with under-sampled aperture according to one embodiment.

FIG. 3A illustrates an antenna array 300 with proper array spacing according to one embodiment. The antenna array 300 has proper array spacing with a first distance 308 between each of the antenna elements 302 of the antenna array 300. FIG. 3B illustrates a graph illustrating a radiation pattern 350 for the antenna array 300 with proper spacing of FIG. 3A, according to one embodiment. The radiation pattern 350 has the same cut angle and sweep as described above with respect to FIG. 2. As illustrated in FIG. 3B, the radiation pattern 350 has a main beam 352 and suppressed grating lobes (not labeled).

Figure 4A:
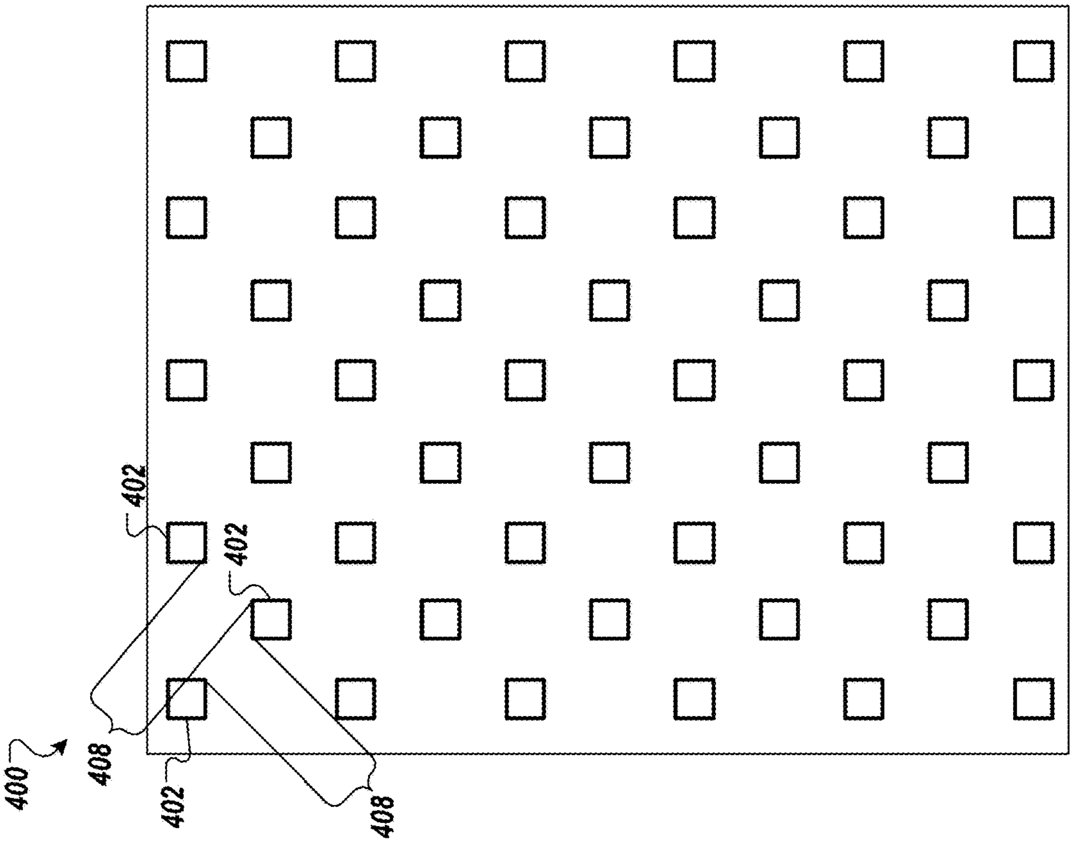
FIG. 4A illustrates an antenna array with an under-sampled aperture according to one embodiment.

FIG. 4A illustrates an antenna array 400 with an under-sampled aperture according to one embodiment. The antenna array 400 does not have proper array spacing. In particular, the array spacing of the antenna array 400 has a first distance 408 between each of the antenna elements 402 of the antenna array 400 that is too large, causing an under-sampling of the aperture, causing grating lobes in the radiation pattern, such as illustrated in FIG. 4B. FIG. 4B illustrates a graph illustrating a radiation pattern 450 for the antenna array 400 with under-sampled aperture according to one embodiment. The radiation pattern 450 has the same cut angle and sweep as described above with respect to FIG. 2. As illustrated in FIG. 4B, the radiation pattern 450 has a main beam 452 and grating lobes 454. The grating lobes 454 are beams that point in undesired directions. The grating lobes 454 can violate regulatory pattern masks when transmitting or can be susceptible to interference/jamming when receiving.

Figure 5B:
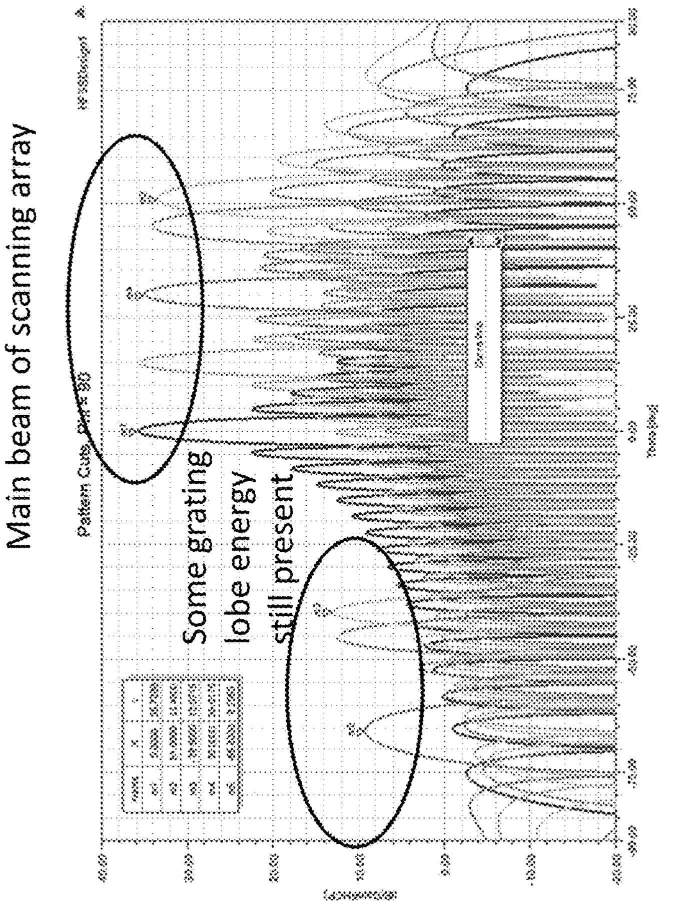
FIG. 5B illustrates a graph illustrating a radiation pattern for the two overlaid antenna arrays according to one embodiment.
Figure 5A:
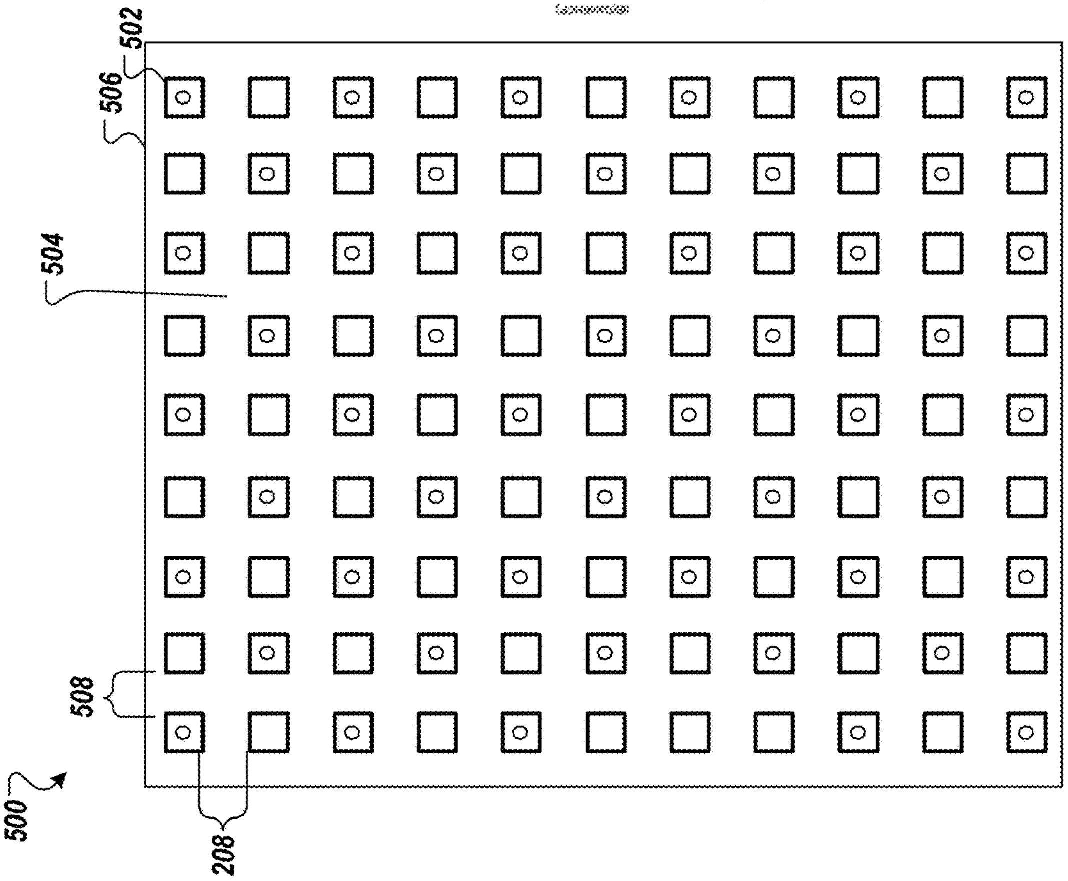
FIG. 5A illustrates two overlaid antenna arrays 500 according to one embodiment.

As described herein, when overlaying the lower frequency array over the higher frequency array, a periodic defect in the lattice at a spacing that is still under-sampled at the higher frequency, such as illustrated in FIG. 5A-5B.

FIG. 5A illustrates two overlaid antenna arrays 500 according to one embodiment. The antenna array 500 does not have proper array spacing for lattices. The array spacing of the antenna array 500 has a first distance 508 between each of the antenna elements 502 of one array and a second distance 510 that is too large for the other array, causing an under-sampling of the aperture in the lower frequency due to the periodic defect in the lattice. The periodic defect causes grating lobes in the radiation pattern, such as illustrated in FIG. 5B. FIG. 5B illustrates a graph illustrating a radiation pattern 550 for the two overlaid antenna arrays 500 according to one embodiment. The radiation pattern 550 has the same cut angle and sweep as described above with respect to FIG. 2. As illustrated in FIG. 5B, the radiation pattern 550 has a main beam 552 and grating lobes 554. The grating lobes 554 are less than the grating lobes 454 of FIG. 4B, but still have some energy present. The grating lobes 554 are beams that point in undesired directions. The grating lobes 554 can violate regulatory pattern masks when transmitting or can be susceptible to interference/jamming when receiving. As described herein, it is impractical to increase the number of antenna elements to oversample the aperture. As illustrated in FIG. 2, the use of parasitic elements results in a radiation pattern similar to the radiation pattern 350 without using additional actively fed antenna elements that increase the number of active components needed to drive the array and increase the costs and power consumption of a design.

As described above, another practical consideration is that degradation in antenna efficiency with overlaid apertures can be observed. As described below, the two overlaid antenna arrays can include dual linearly polarized elements that mitigate performance degradation caused by overlaying two antenna arrays, such as illustrated in FIG. 6.

Figure 6:
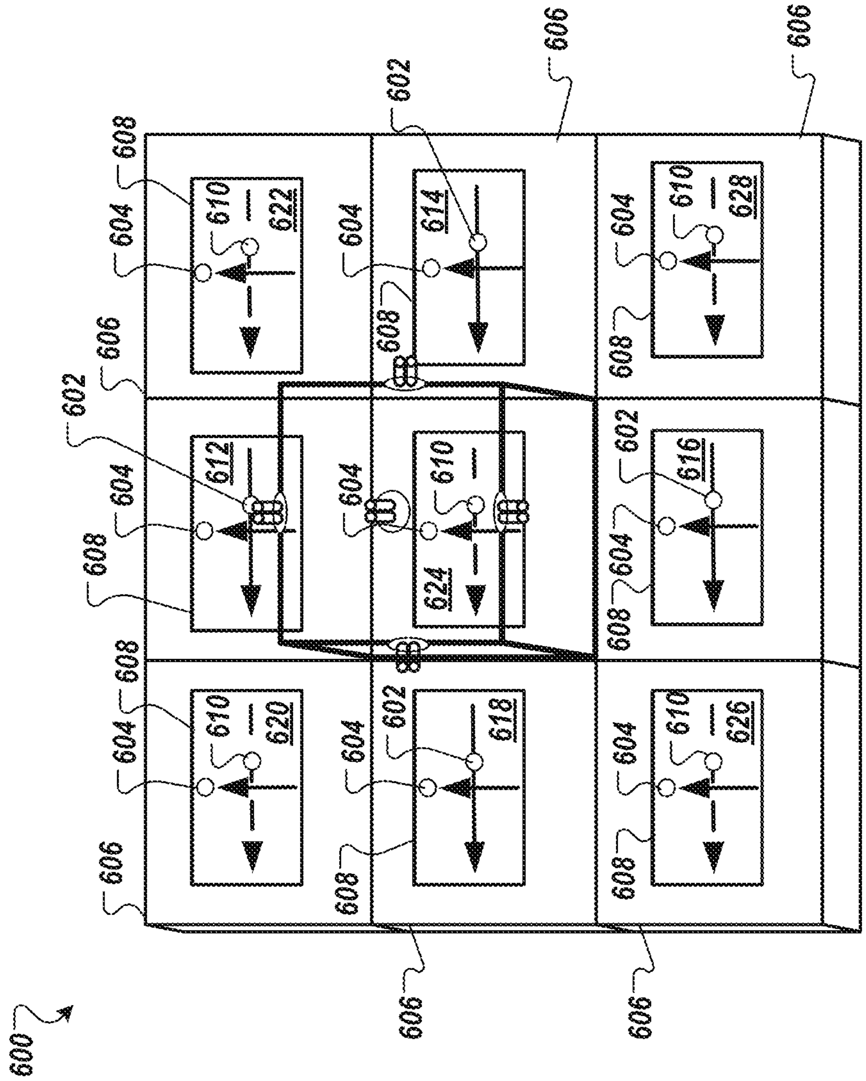
FIG. 6 illustrates a portion of two overlaid phased array antennas made up of nine unit cells according to one embodiment.

FIG. 6 illustrates a portion 600 of two overlaid phased array antennas made up of nine unit cells 606 according to one embodiment. As illustrated in FIG. 6, multiple unit cells 606 can be combined to make up the two overlaid phased array antennas in a single aperture. The aperture is an opening in conductive materials above elements of the two overlaid phased array antennas, including a first phased array antenna and a second phased array antenna. The aperture can be a circular shape and in which the geometric shape of the first phased array antenna and the second phased array fit. In another embodiment, the aperture can be other shapes and sizes, constrained by an area of the first phased array antenna's elements and the second phased array antenna's elements. The elements' area is defined by a size of each element and an inter-element spacing between elements. In one embodiment, the elements of the first and second phased array antennas are disposed on a first side of a support structure within the aperture. The support structure can be a circuit board with one or more planes upon which the elements are disposed. Electronics can be disposed on a second side of the circuit board. For example, a first radio that operates in a first frequency band and a second radio that operates in a second frequency band are disposed on a second side of the circuit board. The first frequency band is lower in frequency than the second frequency band. The first radio and the second radio are not illustrated in FIG. 6. A ground plane can be disposed on the second side of the circuit board The unit cells 606 can be identical for ease of manufacturing, assembly, and part management. The unit cell 606, for example, can be a single SKU. As illustrated in FIG. 6, each unit cell 606 includes a dual linearly polarized element 608 that make up the first phased array antenna and the second phased array antenna 304. Alternating ones of the dual linearly polarized elements 608 are coupled to a first radio and the other alternating ones are not coupled to the first radio. The alternating ones of the dual linearly polarized elements coupled to the first radio are referred to as active antenna elements or actively fed antenna elements. The alternating ones of the dual linearly polarized elements that are not coupled to the first radio are parasitic antenna elements or passive antenna elements. In particular, the dual linearly polarized elements 608 are each coupled to a respective second feed 604 with vertical polarization (corresponding to the short dimension of the dual linearly polarized elements 608). Only some of the dual linearly polarized elements 608 are coupled to a respective first feed 602 with horizontal polarization (corresponding to the long dimension of the dual linearly polarized elements 608 and illustrated with solid arrows). The rest of the dual linearly polarized elements 608 also have horizontal polarization but are not coupled to the respective first feed (corresponding to the long dimension of the dual linearly polarized elements 608 and illustrated with dashed arrows). Instead, the rest of the dual linearly polarized elements 608 (dashed arrows) are terminated at a respective shorting pin 610 (or a matched load) with a parasitic structure (notch filter) coupled to the ground. The individual feed of those polarized elements 608 operates as an open circuit stub at high band transmissions and, at low band transmissions, it modifies the signal as a notch filter. The overlaid arrays are implemented in orthogonal polarizations of the dual linearly polarized elements.

The long dimension of the element with solid lines can have horizontal polarization and operate as the low band. The long dimension of the element with dashed lines can also have horizontal polarization and operate as parasitic elements in the lower band. The short dimension of the elements can have vertical polarization and operate as the high band. All high-band polarization feeds are active and represented by solid arrows. Some of the low-band polarization feeds are active and represented by solid arrows. Some of the low-band polarization feeds are parasitic at the horizontal polarization and represented as dashed arrays. When combined, the collection of unit cells 606 results in specific repeated patterns to create the overlaid phased array antennas in a single aperture. The two overlaid arrays are implemented in orthogonal polarizations of the dual linearly polarized elements. This overlaid array achieves good efficiency by separating the high band and low band into orthogonal linearly polarized components using elements with good cross-polarized isolation. In another embodiment, a meander-line polarizer can be added to achieve circular polarization with this array.

As illustrated in FIG. 6, the unit cell 606 includes thirteen driven or active elements and five parasitic elements. The first phased array antenna includes a first element 612, a second element 614, a third element 616, and a fourth element 618. The first element 612, the second element 614, the third element 616, and the fourth element 618 are arranged in a first diamond shape, with each of the four elements being arranged at a point of the first diamond shape. The set of parasitic elements includes a fifth element 620, a sixth element 622, a seventh element 624, an eighth element 626, and a ninth element 628. The fifth element 620, the sixth elements 622, the seventh element 624, the eighth elements 626, and the ninth element 628 are arranged in an X shape, with each of the four elements being arranged at a point of the X shape and a fifth element arranged at a center of the X shape. Collectively, the first phased array antenna and the set of parasitic elements form the first lattice. The second phased array antenna includes nine elements, one at each of the unit cells 606, that forms the second lattice. In at least one embodiment, the dual linearly polarized elements 608 are patch antennas with two feeds—one for vertical polarization and one for horizontal polarization. In another embodiment, the dual linearly polarized elements 608 can be slot antennas, dipole antennas, circular ring antennas, or the like. In another embodiment, other structures with orthogonal polarizations for the two elements can be used, such as a structure with a first polarization and a second polarization orthogonal to the first polarization. The parasitic elements can be positioned between actively driven elements of the first antenna array to avoid under-sampling the first antenna array.

In at least one embodiment, as illustrated in FIG. 6, a second unit cell 606 is positioned to be adjacent to a first side of a first unit cell 606. The second unit cell 606 can be identical to the first unit cell 606. Another identical unit cell 606 can be adjacent to a second side of the first unit cell 606. Similarly, identical unit cells 606 can be added in either direction to form two overlaid antenna arrays within a single aperture. Each of the unit cells 606 can be made up of a support structure, such as a PCB. The elements are disposed on a surface of the support structure or a plane or layer of the support structure as described herein. The support structures of the multiple unit cells can be connected together or disposed on another support structure. Once constructed, the two overlaid phased array antennas can be disposed in a single aperture as described herein.

It should be noted that although described above as a single feed per element, in other embodiments, each feed can be a multi-point feed, such as a dual-point feed, a quad-point feed, or the like. In the case of two feeds on a single element, the two feeds still have an orientation. It should also be noted that antenna elements can be active antenna elements or terminated elements. A terminated element is an antenna element that is terminated to the ground as a notch filter. An active antenna element is an antenna element coupled to a signal source, such as a radio or a microwave source.

In at least one embodiment, the first phased array antenna's active and parasitic elements are organized as a first lattice structure or a first lattice. The second phased array antenna's active elements are organized as a second lattice structure or a second lattice. The first lattice has a first inter-element spacing of a first distance between each of the first phased array antenna's active and parasitic elements. Each of these elements has a first size proportional to a first wavelength corresponding to a frequency of the first frequency band. It should be noted that the driven elements are spaced by a greater distance than the first distance, but the lattice is defined as having the same distance as the second lattice when parasitic elements are added as described herein. The second lattice has a second inter-element spacing of a second distance between each element of the second phased array antenna. The second distance can be equal to the first distance when using overlaid arrays. Each of these elements of the second phased array antenna has a second size proportional to a second wavelength corresponding to a frequency of the second frequency band. Since the second frequency band is higher than the first frequency band, the second distance is less than the first distance, and the second size is less than the first size.

In some cases, the second lattice is disposed within the spaces between the first lattice's elements. In other cases, the second lattice is rotated 45 degrees with respect to the first lattice to achieve a specific inter-element spacing ratio between the first inter-element spacing and the second inter-element spacing.

As described above, the first phased array antenna, including the parasitic elements, and the second phased array antenna are constructed of unit cells 606, such as illustrated in FIG. 6. The unit cells 606 can be identical tiles. Alternatively, the unit cells do not necessarily need to be identical to fit the arrays' elements within the aperture. In one embodiment, the unit cell includes one element for the first phased array antenna, three for the second phased array antenna, and two parasitic antenna elements. In one embodiment, the unit cell includes two elements for the first phased array antenna, three for the second phased array antenna, and one parasitic antenna element. Alternatively, other combinations of elements from the first phased array antenna, the second phased array antenna, and the parasitic elements can be used.

In another embodiment, the first phased array antenna's elements are spaced apart by a first distance on the support structure's surface. The parasitic elements are located in spaces between the elements of the first phased array antenna on the same surface. The elements of the second phased array antenna are spaced apart by a second distance. In one embodiment, the first size of the elements of the first phased array antenna is proportional to a wavelength corresponding to the first frequency range (e.g., 30 GHz frequency band). The second size of the second phased array antenna's elements is proportional to a wavelength corresponding to the second frequency range (e.g., 20 GHz). In one embodiment, the first frequency range is between approximately 28.5 GHz and approximately 29.1 GHz. In one embodiment, the second frequency range is between approximately 17.7 GHz and approximately 19.3 GHz. Alternatively, other frequency ranges can be used.

Although the various elements of the first phased array antenna and the second phased array antenna 604 are represented in the figures as rectangular elements, any size or type of antenna can be located at the corresponding rectangular element. In some cases, the antenna elements are rectangular-shape patch antenna elements. In another embodiment, the antenna elements are slots in material as slot elements. Alternatively, the elements can be other types of antenna element types used in phased array antennas. Alternatively, the elements are not necessarily part of a phased array antenna but a group of elements that can be used for other wireless communications than beam steering.

Figure 7A:
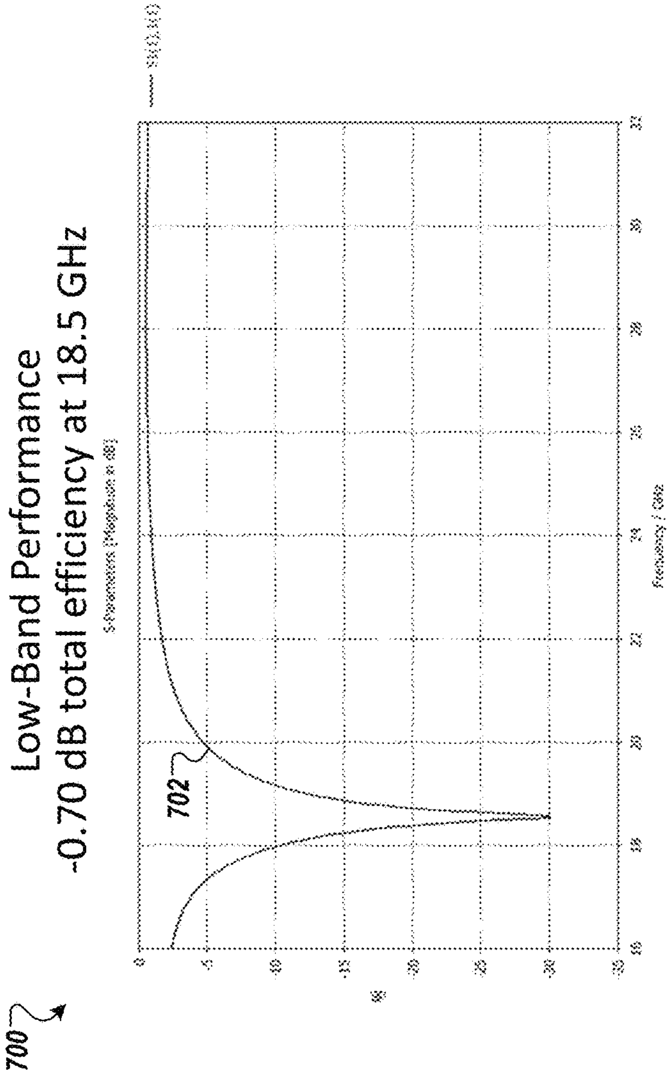
FIG. 7A is a graph of an antenna impedance match of a first antenna array overlaid with a second antenna array according to one embodiment.
Figure 7B:
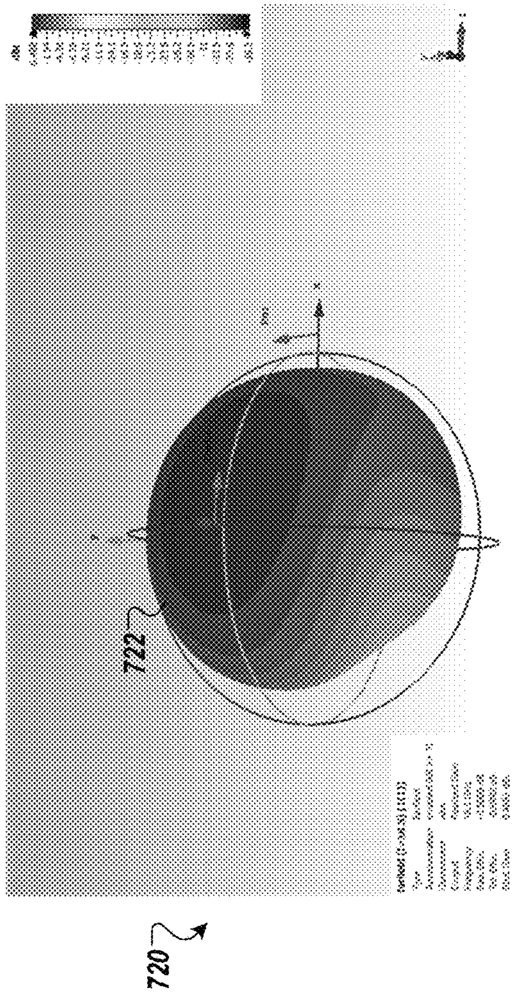
FIG. 7B is a graph of a radiation pattern of the first antenna array according to one embodiment.

FIG. 7A is a graph 700 of an antenna impedance match 702 of a first antenna array overlaid with a second antenna array according to one embodiment. The antenna impedance match 702 is shown as the return loss of the antenna structure, which can be represented as the S-parameter or reflection coefficient or $S_{11}$ of the antenna structure, including the effects caused by the ground plane and the parasitic elements. As shown in FIG. 7A, the return loss is less than −5.0 dB from approximately 17.7 GHz to approximately 19.3 GHz. FIG. 7A shows good antenna performance at the 19 GHz frequency band. Graph 700 shows no undesired resonances or bandwidth degradation. FIG. 7B is a graph 720 of a radiation pattern 722 of the first antenna array according to one embodiment.

Figure 7C:
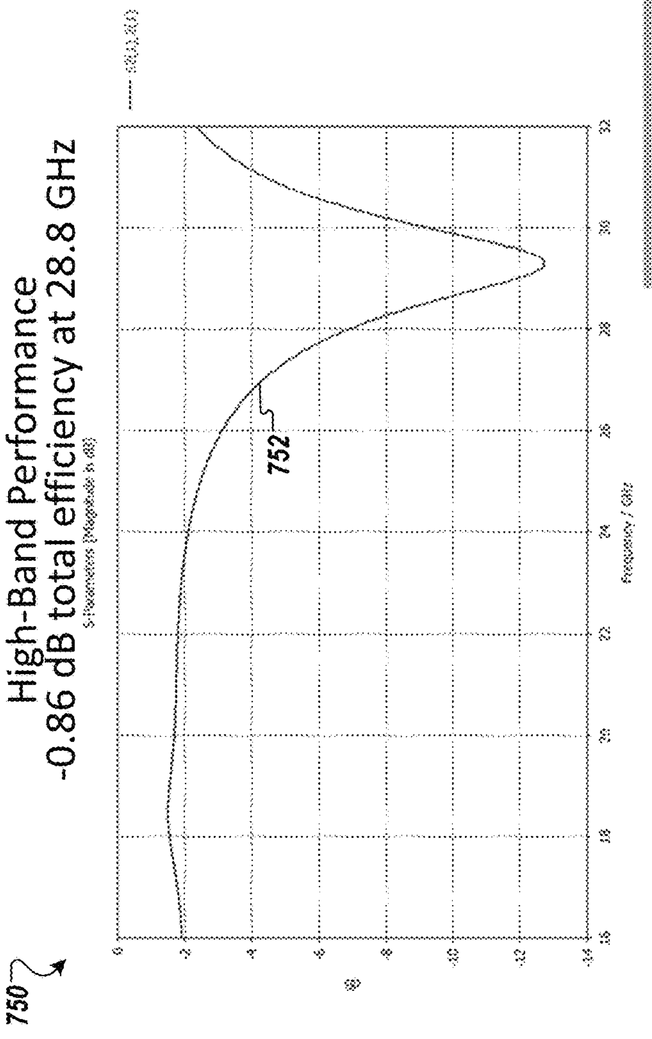
FIG. 7C is a graph of an antenna impedance match of a second antenna array overlaid with a first antenna array according to one embodiment.
Figure 7D:
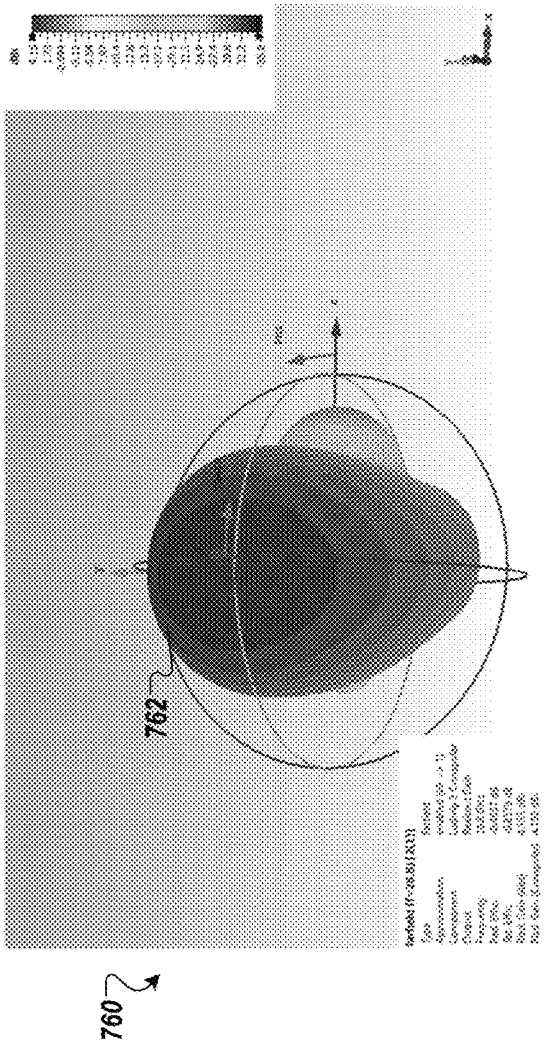
FIG. 7D is a graph of a radiation pattern of the second antenna array according to one embodiment.

FIG. 7C is a graph 750 of an antenna impedance match 752 of a second antenna array overlaid with a first antenna array according to one embodiment. The antenna impedance match 752 is shown as the return loss of the antenna structure, which can be represented as the S-parameter or reflection coefficient or $S_{11}$ of the antenna structure, including the effects caused by the ground plane and the parasitic elements. As shown in FIG. 7C, the return loss is less than −5.0 dB from approximately 28.5 GHz to approximately 29.1 GHz. FIG. 7C shows good antenna performance at the 30 GHz frequency band. Graph 750 shows no undesired resonances or bandwidth degradation. FIG. 7D is a graph 760 of a radiation pattern 762 of the second antenna array according to one embodiment.

Figure 7E:
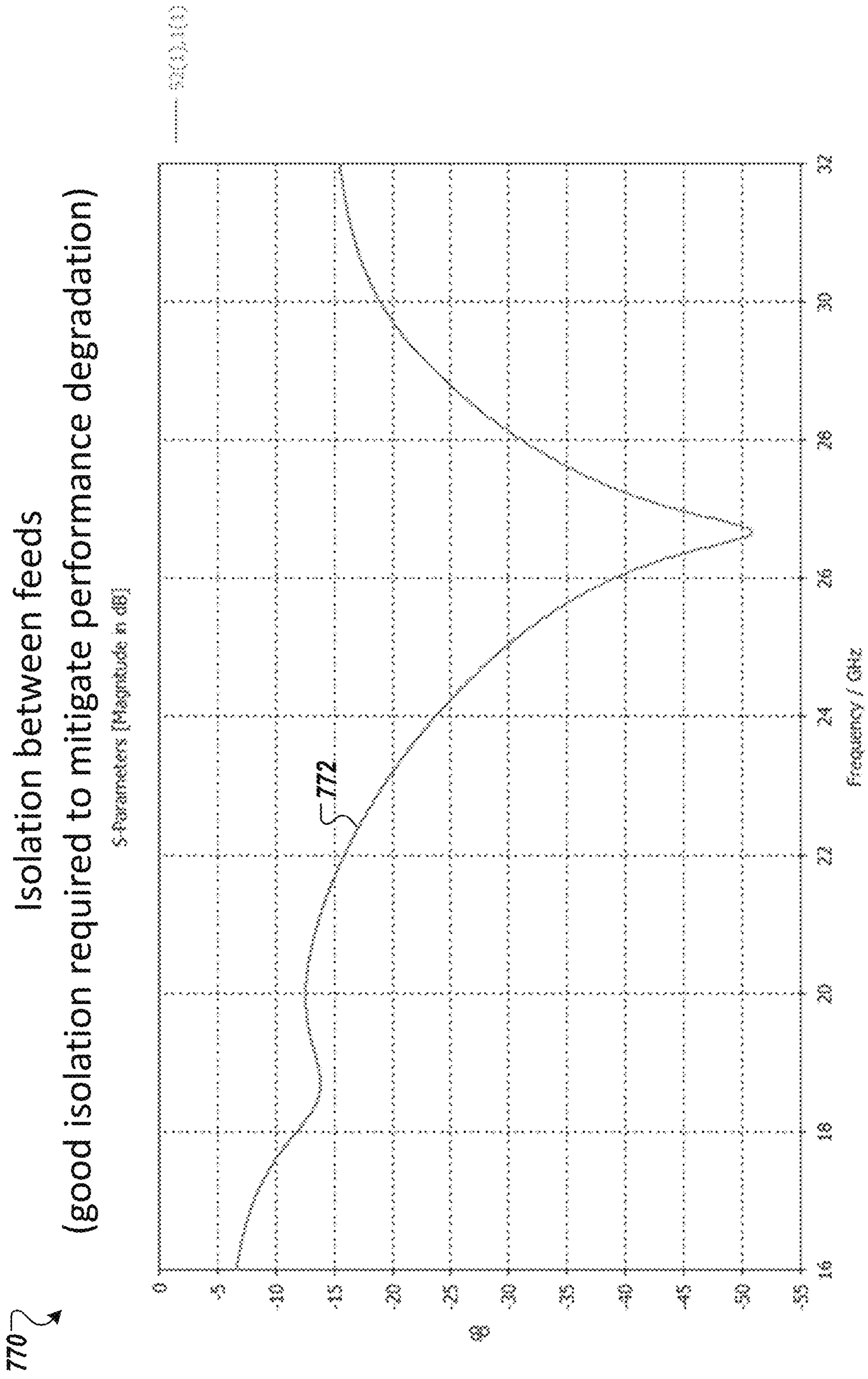
FIG. 7E is a graph of isolation between feeds of a first antenna array and a second antenna array according to one embodiment.

FIG. 7E is a graph 770 of an isolation 772 between feeds of a first antenna array and a second antenna array according to one embodiment. The isolation 772 is shown as the S-parameter or $S_{21}$, which includes the effects caused by the ground plane and the parasitic elements. As described herein, the parasitic elements provide good isolation between the two antennas to mitigate performance degradation caused by overlapping the two lattices.

The elements can be overlaid elements in a single van der Pol square lattice in some embodiments, such as illustrated in FIGS. 8A, 8C, 8E, 8G.

Figure 8A:
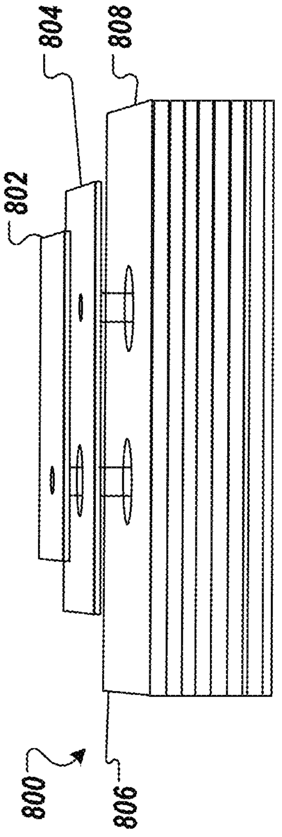
FIG. 8A illustrates a structure of overlaid elements where the elements are centered according to one embodiment.
Figure 8B:
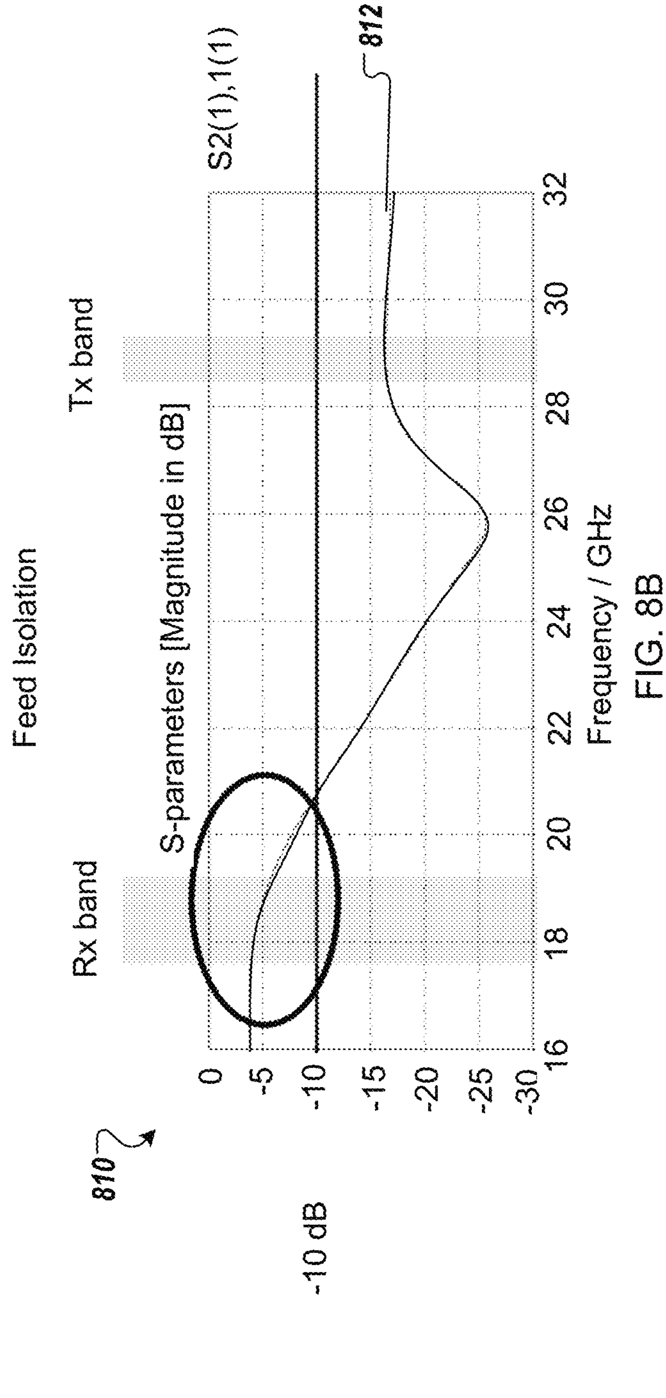
FIG. 8B is a graph of feed isolation of the structure of FIG. 8A according to one embodiment.

FIG. 8A illustrates a structure 800 of overlaid elements where the elements are centered according to one embodiment. The structure 800 includes a higher-band element 802 in a first layer and a lower-band element 804 in a second layer. The higher-band element 802 and the lower-band elements 804 are centered relative to one another. A first feed 806 is coupled to the higher-band element 802 in the first layer through at least the second layer. A second feed 808 is coupled to the lower-band element 804 in the second layer. Both feeds can be vias through one or more layers of a circuit board, as illustrated in FIG. 8A. FIG. 8B is a graph 810 of a feed isolation 812 of the structure 800 of FIG. 8A. As illustrated in FIG. 8B, the feed isolation 812 is less than a specified power level (e.g., −10 dB) in a transmit (TX) band and higher than the specified power level in a receive (RX) band.

Figure 8C:
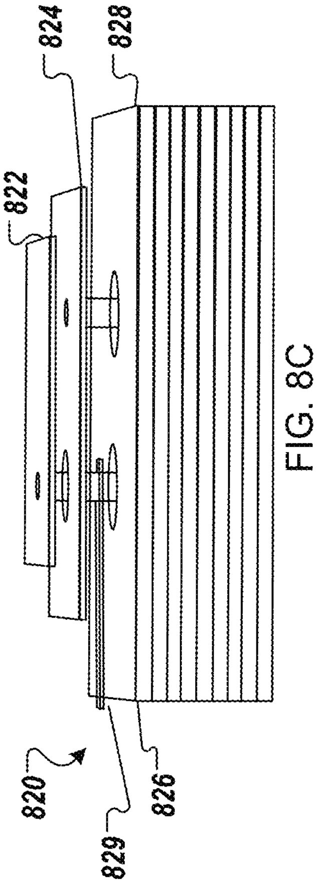
FIG. 8C illustrates a structure of overlaid elements where the elements are centered, and a stub is coupled to a high-band feed according to one embodiment.
Figure 8D:
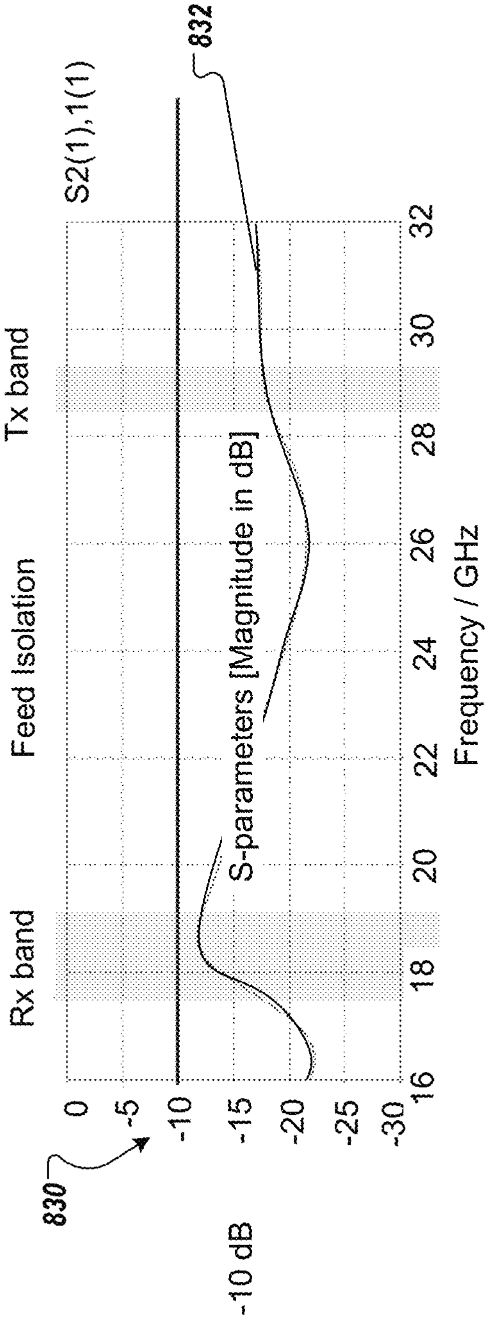
FIG. 8D is a graph of feed isolation of the structure of FIG. 8C according to one embodiment.

FIG. 8C illustrates a structure 820 of overlaid elements where the elements are centered and a stub is coupled to a high-band feed according to one embodiment. The structure 820 includes a higher-band element 822 in a first layer and a lower-band element 824 in a second layer. The higher-band element 802 and the lower-band elements 804 are centered relative to one another. A first feed 826 is coupled to the higher-band element 802 in the first layer through at least the second layer. A second feed 828 is coupled to the lower-band element 824 in the second layer. Both feeds can be vias through one or more layers of a circuit board, as illustrated in FIG. 8C. A stub 829 is coupled to the first feed 826. FIG. 8D is a graph 830 of a feed isolation 832 of the structure 820 of FIG. 8C. As illustrated in FIG. 8D, the feed isolation 812 is less than a specified power level (e.g., −10 dB) in a TX band and an RX band.

Figure 8E:
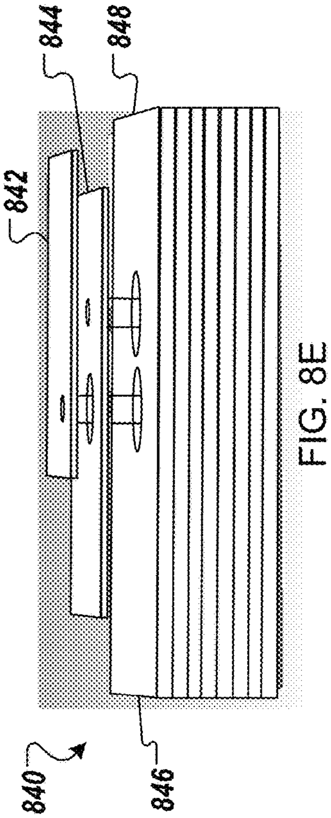
FIG. 8E illustrates a structure of overlaid elements where the elements are staggered to a side opposite the low-band feed according to one embodiment.
Figure 8F:
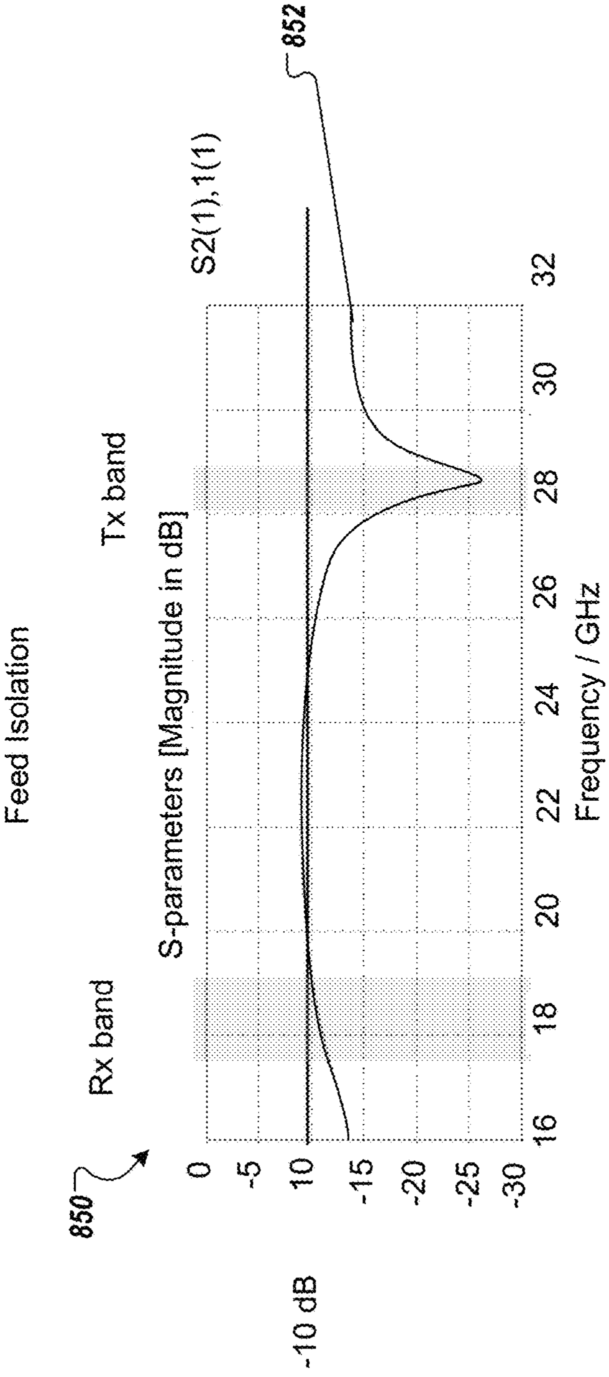
FIG. 8F is a graph of feed isolation of the structure of FIG. 8E according to one embodiment.

FIG. 8E illustrates a structure 840 of overlaid elements where the elements are staggered to a side opposite the low-band feed according to one embodiment. The structure 840 includes a higher-band element 842 in a first layer and a lower-band element 844 in a second layer. A first feed 846 is coupled to the higher-band element 842 in the first layer through at least the second layer. A second feed 848 is coupled to the lower-band element 844 in the second layer. Both feeds can be vias through one or more layers of a circuit board, as illustrated in FIG. 8E. The higher-band element 842 and the lower-band elements 804 are staggered to the opposite side of the second feed 848. FIG. 8F is a graph 850 of a feed isolation 852 of the structure 840 of FIG. 8E. As illustrated in FIG. 8F, the feed isolation 852 is less than a specified power level (e.g., −10 dB) in a TX band and an RX band.

Figure 8G:
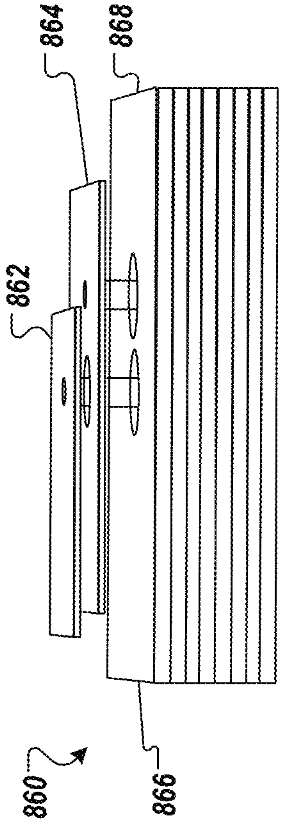
FIG. 8G illustrates a structure of overlaid elements where the elements are staggered to the same side as the low-band feed according to one embodiment.
Figure 8H:
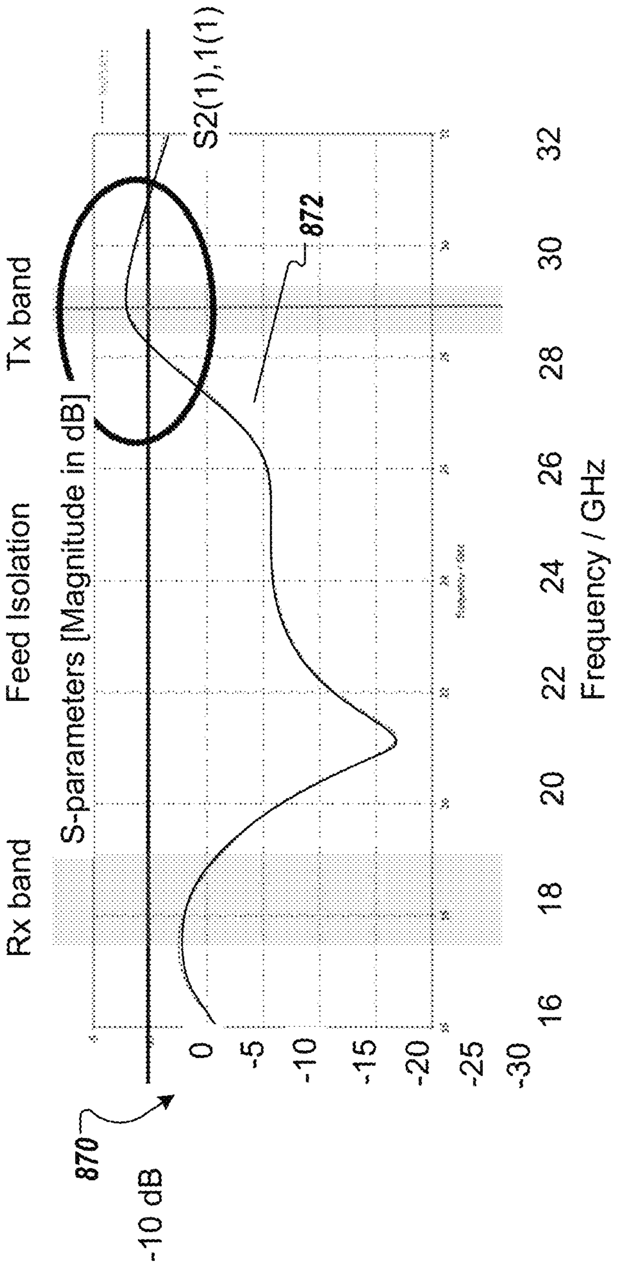
FIG. 8H is a graph of feed isolation of the structure of FIG. 8G according to one embodiment.

FIG. 8G illustrates a structure 860 of overlaid elements where the elements are staggered to the same side as the low-band feed according to one embodiment. The structure 860 includes a higher-band element 862 in a first layer and a lower-band element 864 in a second layer. A first feed 866 is coupled to the higher-band element 862 in the first layer through at least the second layer. A second feed 868 is coupled to the lower-band element 864 in the second layer. Both feeds can be vias through one or more layers of a circuit board, as illustrated in FIG. 8G. The higher-band element 864 and the lower-band elements 804 are staggered to the same side as the second feed 866. FIG. 8H is a graph 870 of a feed isolation 872 of the structure 860 of FIG. 8G. As illustrated in FIG. 8H, the feed isolation 872 is less than a specified power level (e.g., −10 dB) in an RX band and higher than the specified power level in a TX band.

Figure 9A:
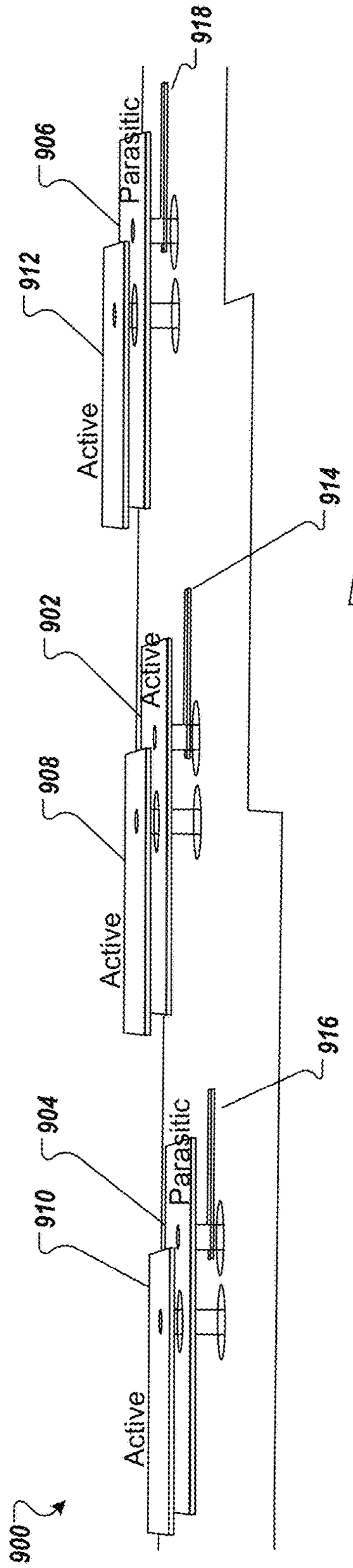
FIG. 9A is a perspective view of a unit cell with an active lower-band element, two parasitic elements, and three active higher-band elements according to one embodiment.

FIG. 9A is a perspective view of a unit cell 900 with an active lower-band element 902, two parasitic elements 904, 906, and three active higher-band elements 908, 910, 912 according to one embodiment. The unit cell 900, for example, can be a single SKU, and multiple unit cells can be identical for ease of manufacturing, assembly, and part management. As illustrated in FIG. 9A, unit cell 900 includes a structure with one or more layers of a circuit board or other types of structures. The unit cell 900 includes, in a first layer, an active lower-band element 902 that is coupled to a first radio (not illustrated in FIG. 9A) via a first feed. The first radio operates in a first frequency range. A first stub 914 is coupled to the first feed. The first stub 914 operates as a notch filter as described herein.

The unit cell 900 also includes, in the first layer, a first parasitic element 904 and a second parasitic element 906 that are parasitic in the lower band. The active lower-band element 902 causes currents to be induced on the first and second parasitic elements 904, 906 during operation. Unlike the active lower-band element 902, the first and second parasitic elements 904, 906 are not coupled to the first radio. The feed of the first parasitic element 904 is coupled to a second stub 916, and the feed of the second parasitic element 906 is coupled to a third stub 918. The second stub 916 and the third stub 918 are used in connection with the first and second parasitic elements 904, 906 to form a similar structure as the first stub 914 used in connection with the active lower-band element 902. In this manner, the same antenna structure is presented to the higher-band elements, regardless of whether the higher-band element is disposed above an active element or a parasitic element. The stubs on the low-band feeds improve the TX/RX port isolation at the TX band. In at least one embodiment, the stubs can be disposed above the ground plane to conserve real estate on inner RF routing layers in the unit cell 900. Because the parasitic elements' low-band feeds are not driven, the parasitic elements appear as the same impedance as the active lower-band element 902. The second and third stubs operate as notch filters with respect to the higher frequencies. The unit cell 900 also includes, in a second layer above the first layer, a first active higher-band element 908, a second active higher-band element 910, and a third active higher-band element 912. The first active higher-band element 908 is disposed above the active lower-band element 902. The second active higher-band element 910 is disposed above the first parasitic element 904, and the third active higher-band element 912 is disposed above the second parasitic element 906. Each of the first active higher-band element 908, the second active higher-band element 910, and the third active higher-band element 912 is coupled to a second radio that operates in a second frequency range that is higher than the first frequency range of the first radio. The first radio and the second radio can be the same and can operate at the two frequency ranges in another embodiment.

As illustrated in FIG. 9A, the unit cell 900 includes four driven or active elements and two parasitic elements. Alternatively, other patterns of active and parasitic elements can be used. In at least one embodiment, the elements of the first phased array antenna (e.g., RX array) are spaced apart with a first specified inter-element spacing value of approximately 9.69 mm. The elements of the second phased array antenna (e.g., TX array) are spaced apart with a second specified inter-element spacing value of approximately 5.59 mm. Alternatively, other spacing values can be used for the first phased array and the second phased array. The unit cell 900 can be used with other multiple unit cells to make up the two overlaid phased array antennas, such as illustrated in FIG. 9B.

Figure 9B:
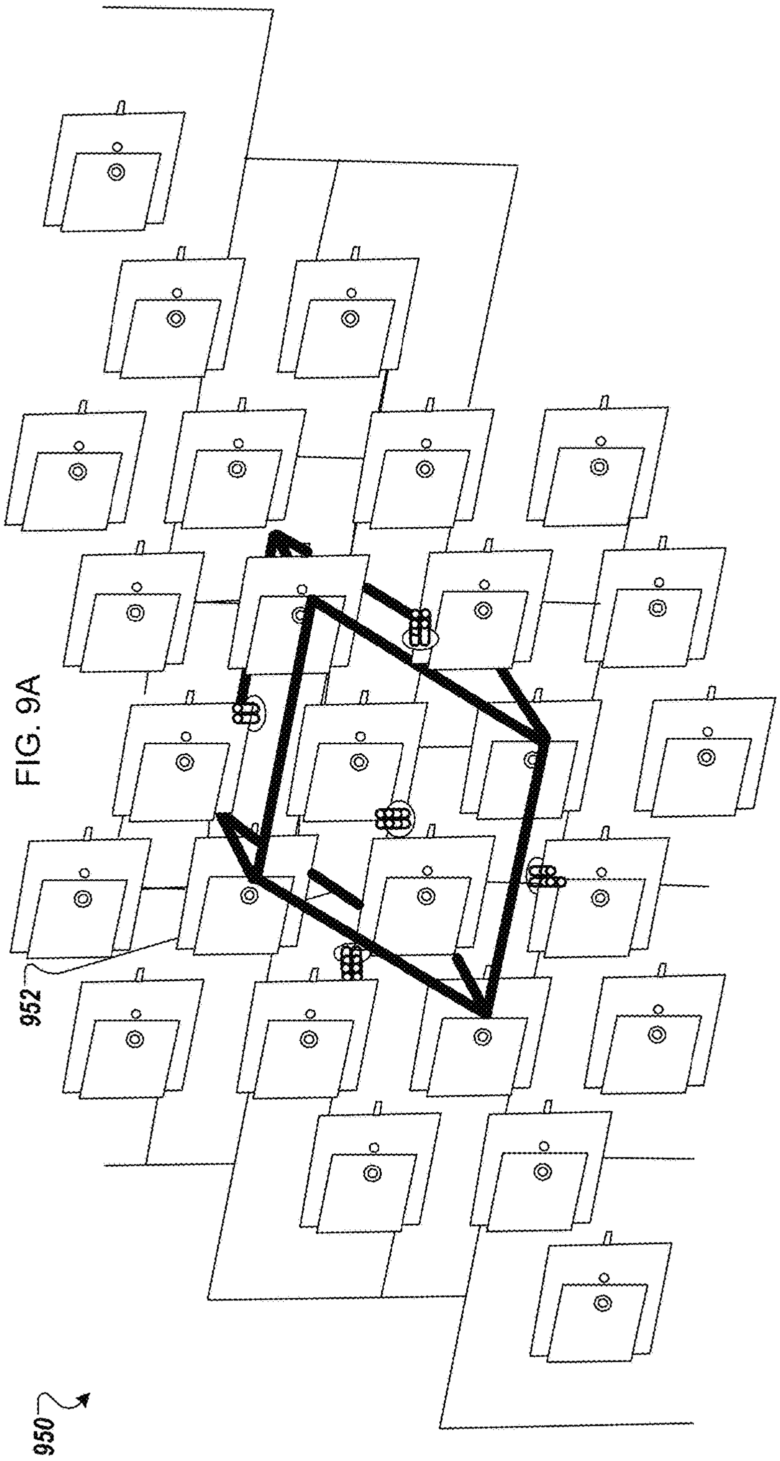
FIG. 9B illustrates a portion of two overlaid phased array antennas made up of multiple unit cells according to one embodiment.

FIG. 9B illustrates a portion 950 of two overlaid phased array antennas made up of multiple unit cells according to one embodiment. The portion 950 includes multiple unit cells that can be coupled together. FIG. 9B illustrates a box 952 around one of the multiple unit cells. Each of the multiple unit cells can be the unit cell 900 of FIG. 9A.

Figure 10A:
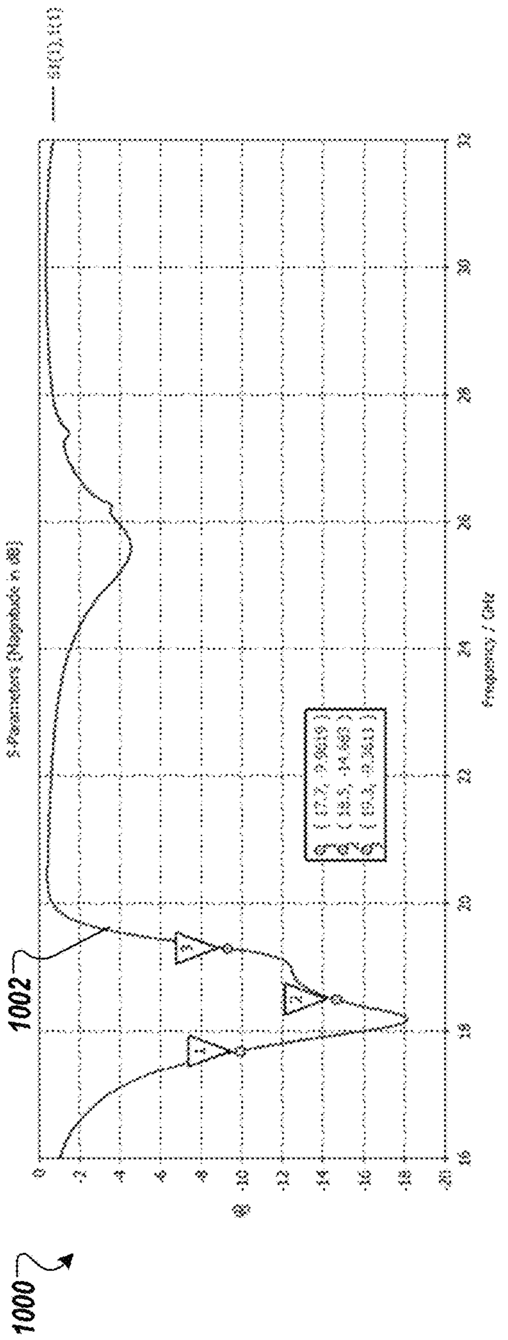
FIG. 10A is a graph of an antenna impedance match of a first antenna array overlaid with a second antenna array according to one embodiment.

FIG. 10A is a graph 1000 of an antenna impedance match 1002 of a first antenna array overlaid with a second antenna array according to one embodiment. The antenna impedance match 1002 is shown as the return loss of the antenna structure, which can be represented as the S-parameter or reflection coefficient or $S_{11}$ of the antenna structure, including the effects caused by the ground plane and the parasitic elements. As shown in FIG. 10A, the return loss is less than −5.0 dB from approximately 17.7 GHz to approximately 19.3 GHz. FIG. 10A shows good antenna performance at the 19 GHz frequency band. Graph 1000 shows no undesired resonances or bandwidth degradation.

Figure 10B:
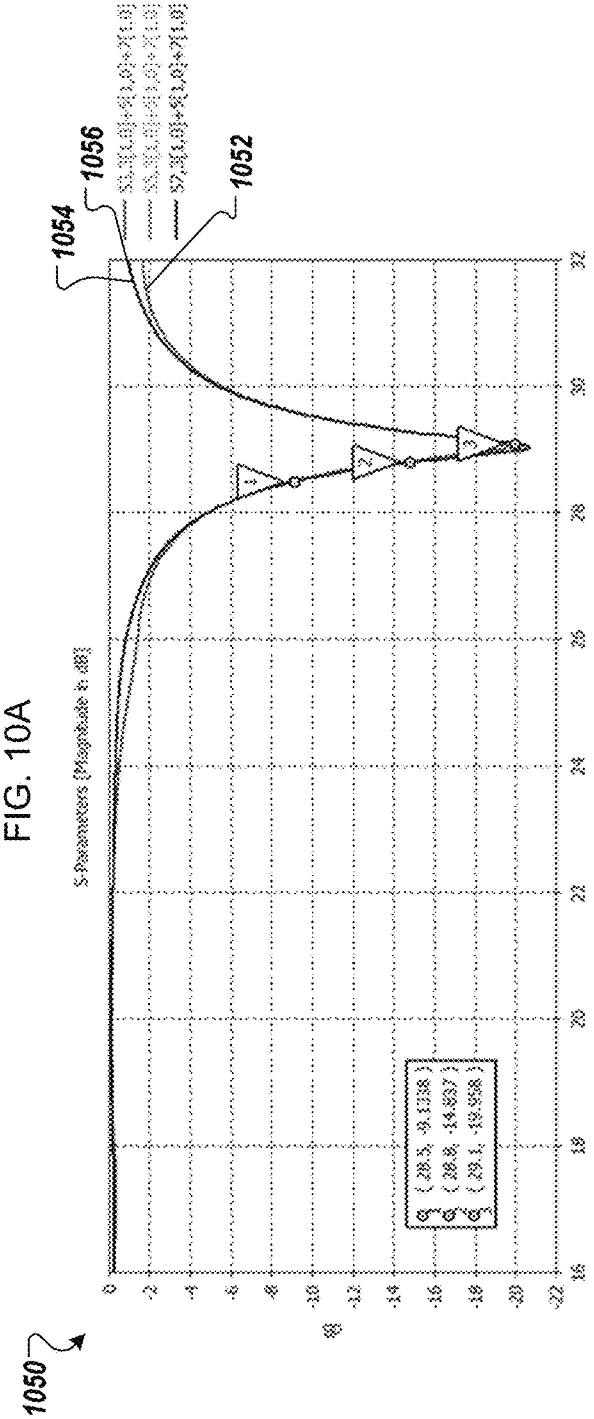
FIG. 10B is a graph of an antenna impedance match of a second antenna array overlaid with a first antenna array according to one embodiment.

FIG. 10B is a graph 1050 of antenna impedance matches of a second antenna array overlaid with a first antenna array according to one embodiment. The antenna impedance matches include a first antenna impedance match 1052 (reflection coefficient $S_{33}$) relative to an actively driven antenna element of the first antenna array, a second antenna impedance match 1054 ($S_{53}$) relative to a first parasitic element of the first antenna array, and a third antenna impedance match 1056 ($S_{73}$) relative to a second parasitic element of the first antenna array. As shown in FIG. 10B, the return loss is less than −5.0 dB from approximately 28.5 GHz to approximately 29.1 GHz. FIG. 10B shows good antenna performance at the 30 GHz frequency band. Graph 750 shows no undesired resonances or bandwidth degradation.

Figure 11A:
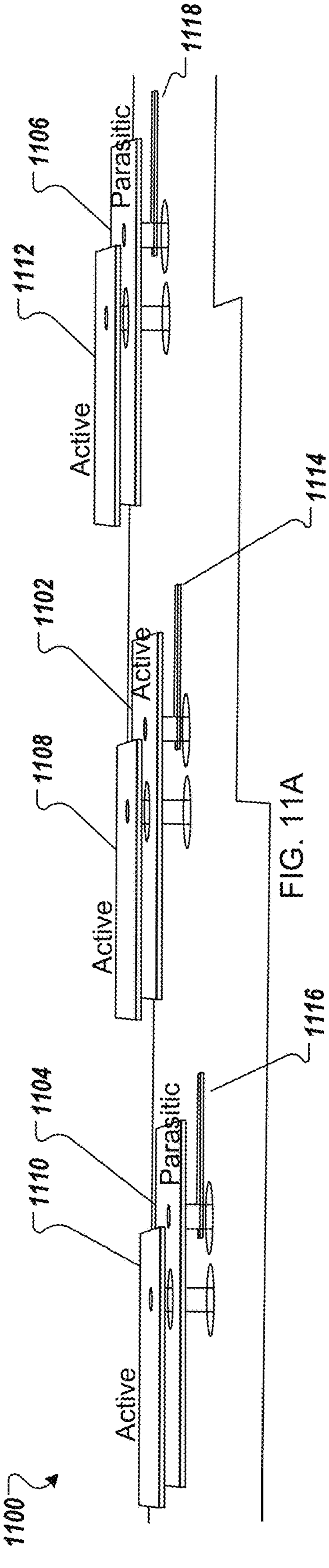
FIG. 11A is a perspective view of a unit cell with an active lower-band element, two parasitic elements, and three active higher-band elements with a stub according to one embodiment.

FIG. 11A is a perspective view of a unit cell 1100 with an active lower-band element 1102, two parasitic elements 1104, 1106, and three active higher-band elements 1108, 1110, 1112 with a stub according to one embodiment. The unit cell 1100, for example, can be a single SKU, and multiple unit cells can be identical for ease of manufacturing, assembly, and part management. As illustrated in FIG. 11A, unit cell 1100 includes a structure with one or more layers of a circuit board or other type of structure. The unit cell 1100 includes, in a first layer, an active lower-band element 1102 that is coupled to a first radio (not illustrated in FIG. 11A) via a first feed. The first radio operates in a first frequency range. A first stub 1114 is coupled to the first feed.

The unit cell 1100 also includes, in the first layer, a first parasitic element 1104 and a second parasitic element 1106 that are parasitic in the lower band. The active lower-band element 1102 causes currents to be induced on the first and second parasitic elements 1104, 1106 during operation. Unlike the active lower-band element 1102, the first and second parasitic elements 1104, 1106 are not coupled to the first radio. The feed of the first parasitic element 1104 is coupled to a second stub 1116, and the feed of the second parasitic element 1106 is coupled to a third stub 1118. The stubs on the low-band feeds improve the TX/RX port isolation at the TX band. In at least one embodiment, the stubs can be disposed above the ground plane to conserve real estate in the inner RF routing layers in the unit cell 1100. Because the parasitic elements' low-band feeds are not driven, the parasitic elements appear as the same impedance as the active lower-band element 1102. The second and third stubs operate as notch filters with respect to the higher frequencies. The unit cell 1100 also includes, in a second layer above the first layer, a first active higher-band element 1108, a second active higher-band element 1110, and a third active higher-band element 1112. The first active higher-band element 1108 is disposed above the active lower-band element 1102. The second active higher-band element 1110 is disposed above the first parasitic element 1104, and the third active higher-band element 1112 is disposed above the second parasitic element 1106. Each of the first active higher-band element 1108, the second active higher-band element 1110, and the third active higher-band element 1112 is coupled to a second radio that operates in a second frequency range that is higher than the first frequency range of the first radio. The first radio and the second radio can be the same and can operate at the two frequency ranges in another embodiment.

As illustrated in FIG. 11A, the unit cell 1100 includes four driven or active elements and two parasitic elements. Alternatively, other patterns of active and parasitic elements can be used. In at least one embodiment, the elements of the first phased array antenna (e.g., RX array) are spaced apart with a first specified inter-element spacing value of approximately 9.69 mm. The elements of the second phased array antenna (e.g., TX array) are spaced apart with a second specified inter-element spacing value of approximately 5.59 mm. Alternatively, other spacing values can be used for the first phased array and the second phased array. The unit cell 1100 can be used with other multiple unit cells to make up the two overlaid phased array antennas, such as illustrated in FIG. 11B.

Figure 11B:
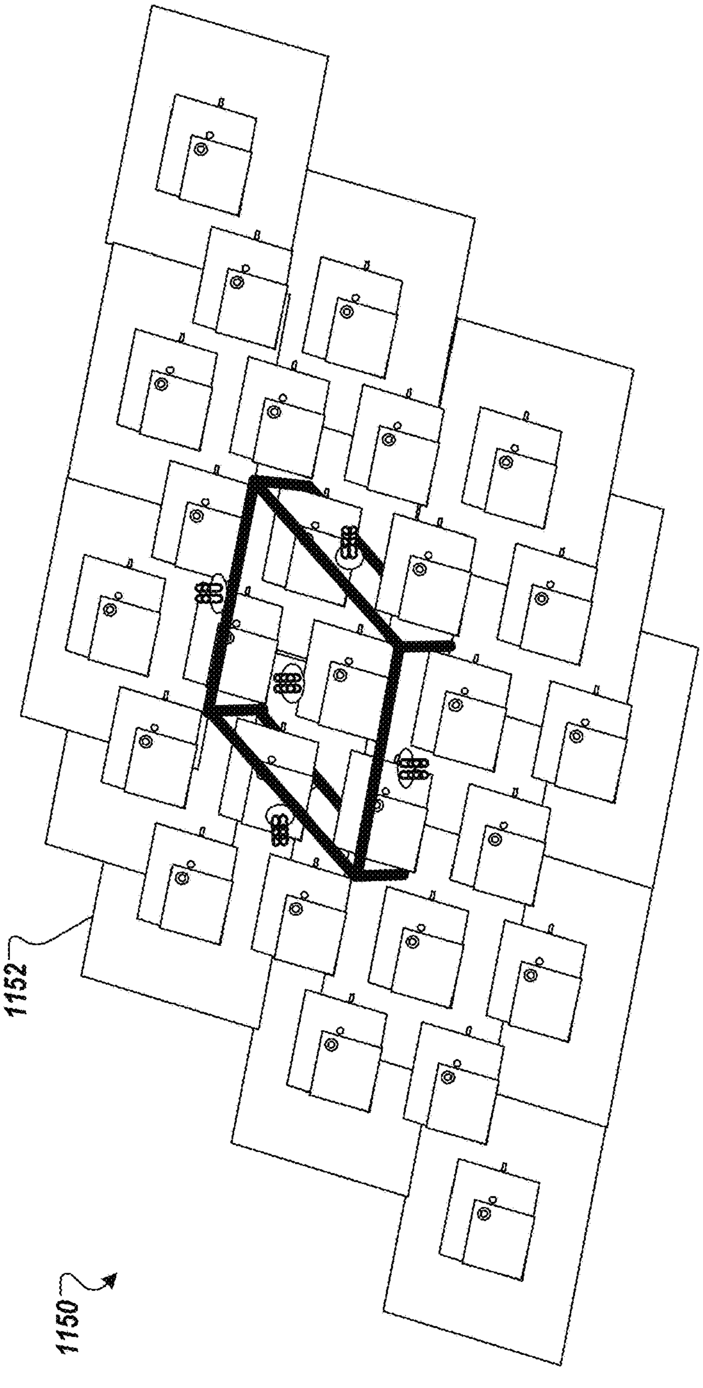
FIG. 11B illustrates a portion of two overlaid phased array antennas made up of multiple unit cells according to one embodiment.

FIG. 11B illustrates a portion 1150 of two overlaid phased array antennas made up of multiple unit cells according to one embodiment. The portion 1150 includes multiple unit cells that can be coupled together. FIG. 11B illustrates a box 1152 around one of the multiple unit cells. Each of the multiple unit cells can be the unit cell 1100 of FIG. 11A.

Figure 12A:
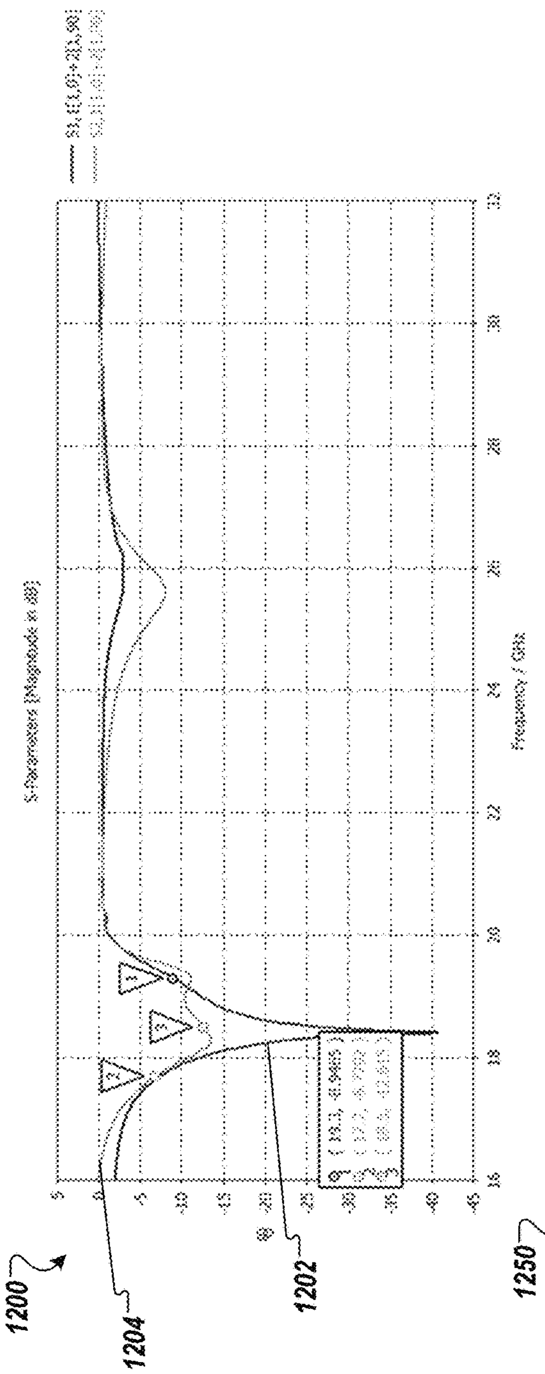
FIG. 12A is a graph of an antenna impedance match of a first antenna array overlaid with a second antenna array according to one embodiment.

FIG. 12A is a graph 1200 of an antenna impedance match 1202 of a first antenna array overlaid with a second antenna array according to one embodiment. The antenna impedance match 1202 is shown as the return loss of the antenna structure, which can be represented as the S-parameter or reflection coefficient or $S_{11}$ of the antenna structure, including the effects caused by the ground plane and the parasitic elements. As shown in FIG. 12A, the return loss is less than −5.0 dB from approximately 17.7 GHz to approximately 19.3 GHz. FIG. 12A shows good antenna performance at the 19 GHz frequency band. Graph 1200 shows no undesired resonances or bandwidth degradation. Graph 1200 also shows the transmission coefficient or S21 of the antenna structure.

Figure 12B:
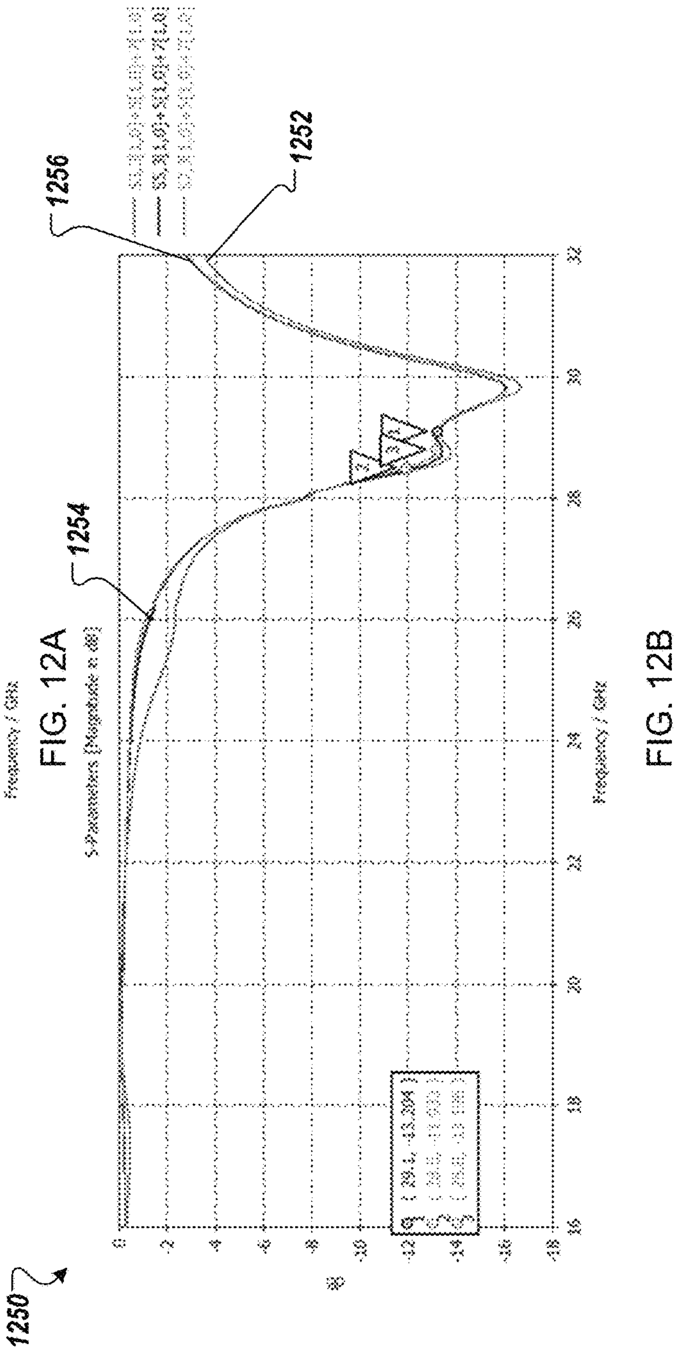
FIG. 12B is a graph of an antenna impedance match of a second antenna array overlaid with a first antenna array according to one embodiment.

FIG. 12B is a graph 1250 of antenna impedance matches of a second antenna array overlaid with a first antenna array according to one embodiment. The antenna impedance matches include a first antenna impedance match 1252 (reflection coefficient S33) relative to an actively driven antenna element of the first antenna array, a second antenna impedance match 1254 (S53) relative to a first parasitic element of the first antenna array, and a third antenna impedance match 1256 (S73) relative to a second parasitic element of the first antenna array. As shown in FIG. 12B, the return loss is less than −5.0 dB from approximately 28.5 GHz to approximately 29.1 GHz. FIG. 12B shows good antenna performance at the 30 GHz frequency band. Graph 1250 shows no undesired resonances or bandwidth degradation.

Figure 13A:
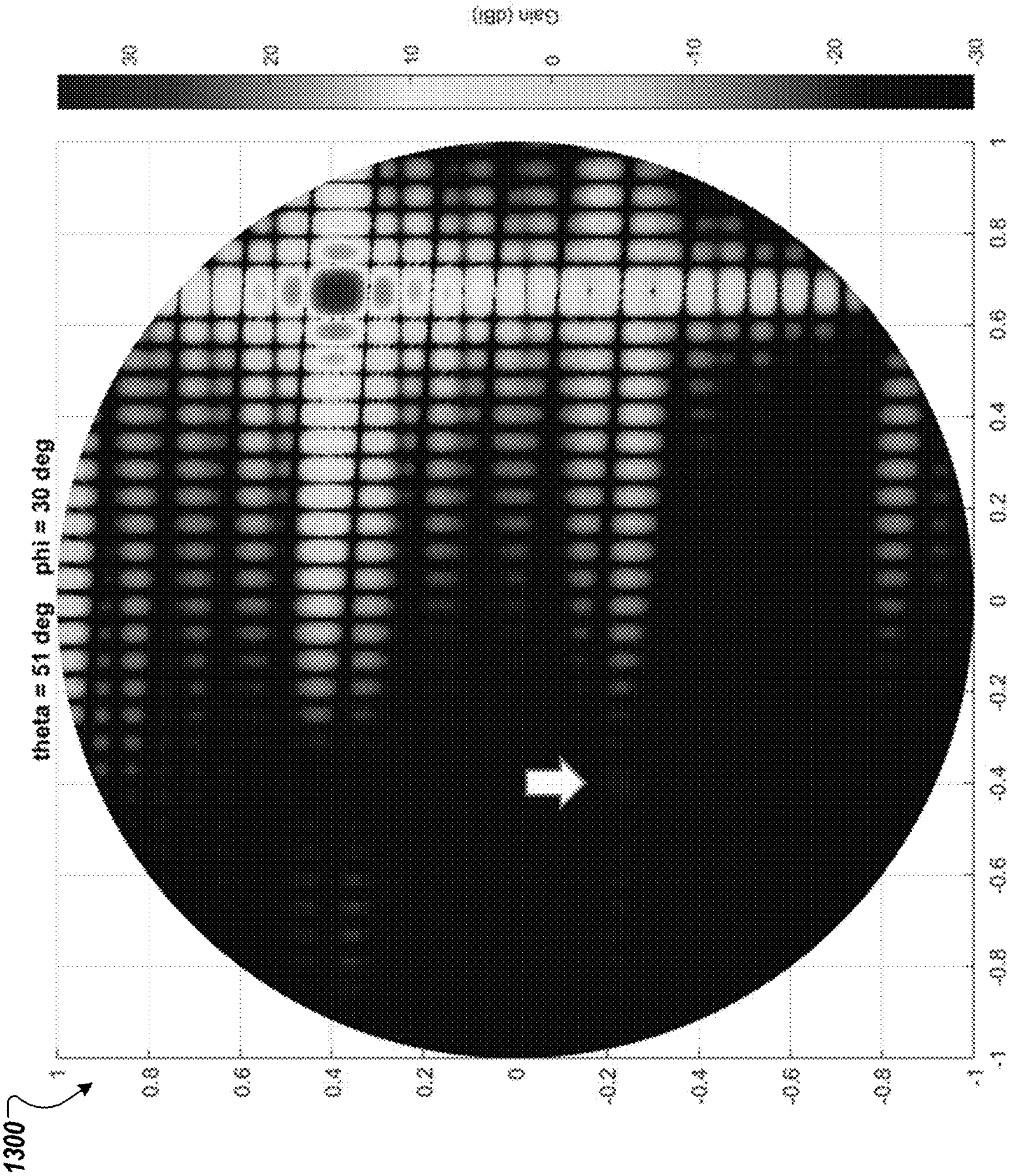
FIG. 13A is a first view of a heat map of a transmit (TX) array pattern with multiple unit cells according to one embodiment.
Figure 13B:
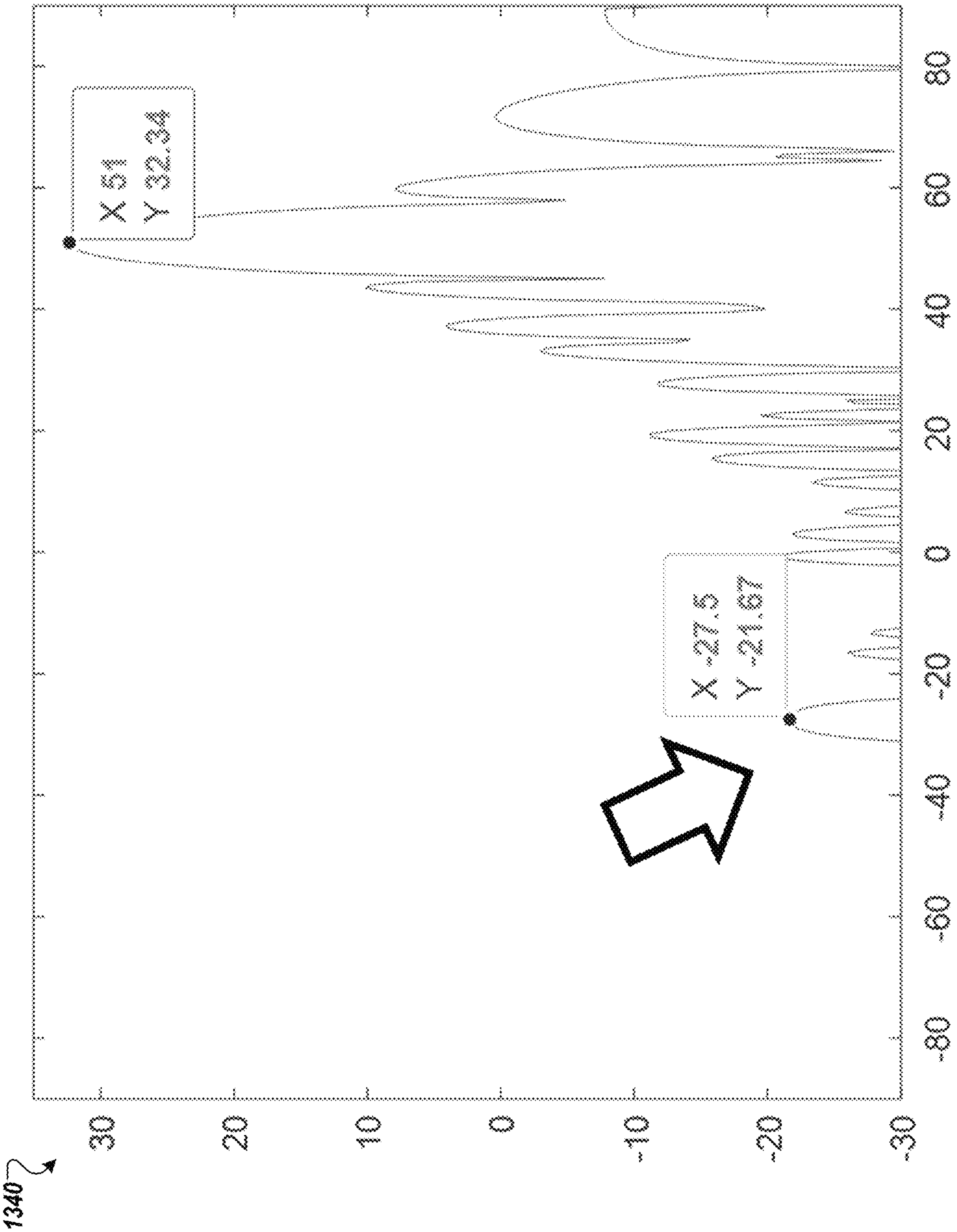
FIG. 13B is a second view of a heat map of the TX array pattern with multiple unit cells according to one embodiment.
Figure 13C:
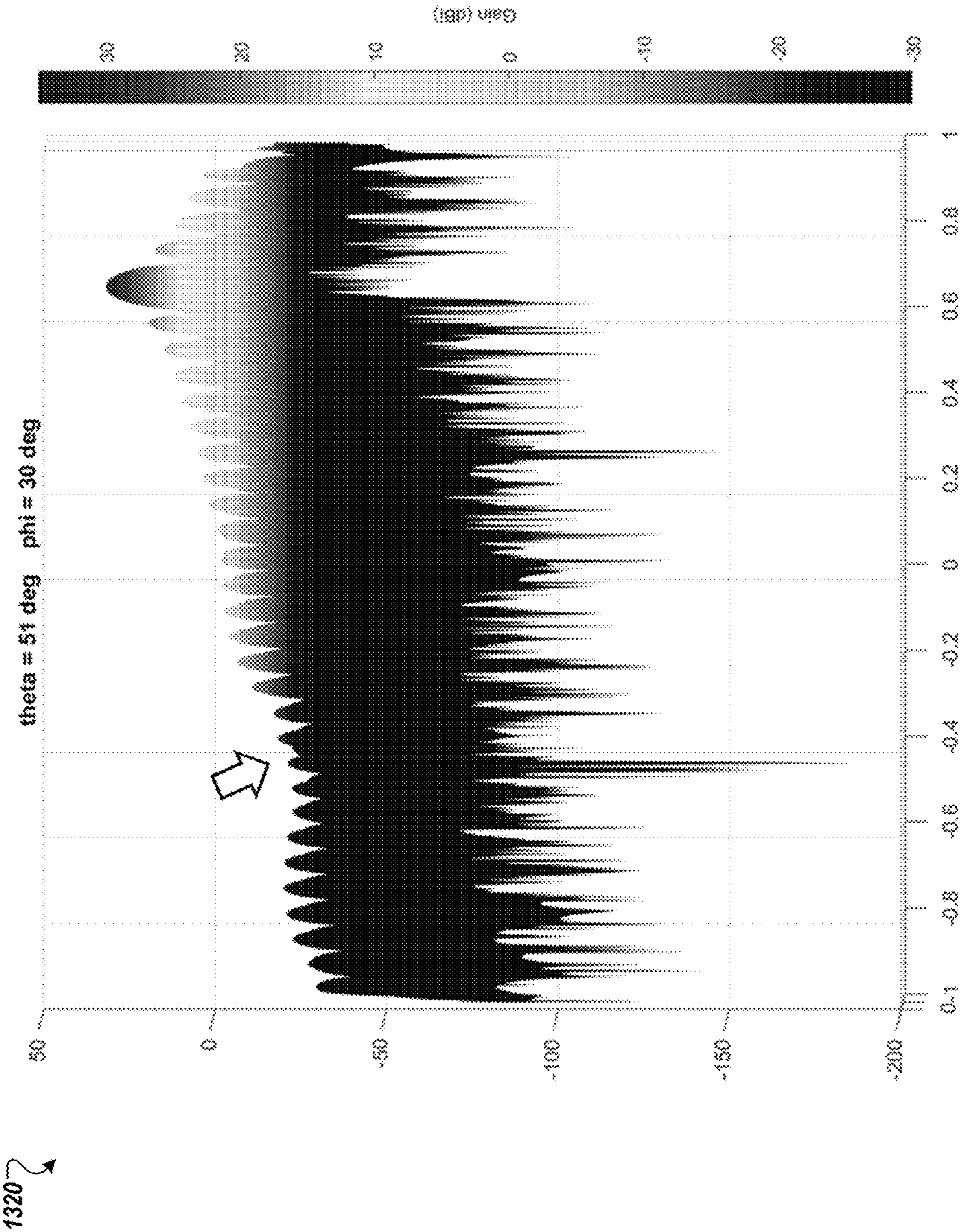
FIG. 13C is a graph illustrating a radiation pattern with a main beam and suppressed grating lobes of a TX array pattern with multiple unit cells according to one embodiment.

FIG. 13A is first view of a heat map 1300 of a TX array pattern with multiple unit cells according to one embodiment. FIG. 13B is a second view of a heat map 1320 of the TX array pattern with multiple unit cells according to one embodiment. FIG. 13 is a graph 1340 illustrating a radiation pattern with a main beam and suppressed grating lobes of a TX array pattern with multiple unit cells, according to one embodiment. The TX array pattern includes 18×18 unit cells with 3 elements per cell. The heat maps 1300, 1320 are generated with the theta angle being equal to 51 degrees and the phi angle being equal to 30 degrees. The heat maps 1300, 1320 and graph 1340 show a right-hand circular polarization (RHCP) realized gain at 28.8 GHz, with a peak of the main beam at 32.34 dBi, a grating lobe at −21.67 dBi, resulting in −54.0 dBc between the peak of the main beam and the grating lobe.

Figure 14:
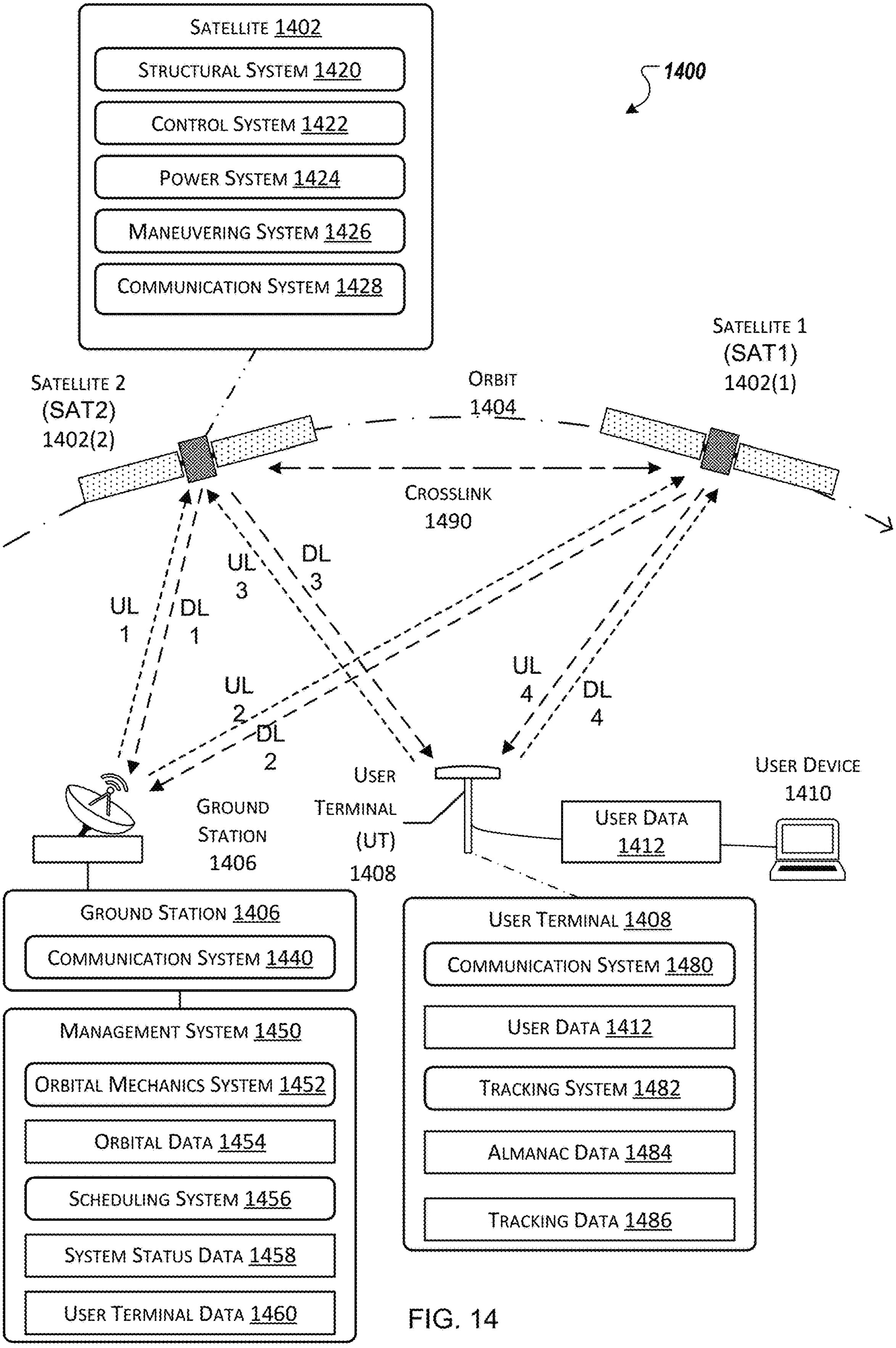
FIG. 14 illustrates a portion of a communication system that includes two satellites of a constellation of satellites, each satellite being in orbit, according to embodiments of the present disclosure.

FIG. 14 illustrates a portion of a communication system 1400 that includes two satellites of a constellation of satellites 1402(1), 1402(2), . . . , 1402(S), each satellite 1402 being in orbit 1404 according to embodiments of the present disclosure. The communication system 1400 shown here comprises a plurality (or "constellation") of satellites 1402 (1), 1402(2), . . . , 1402(S), each satellite 1402 being in orbit 1404. Any of the satellites 1402 can include the communication system that includes the antenna modules of FIGS. 1-6. Also shown is a ground station 1406, user terminal (UT) 1408, and a user device 1410.

The constellation may comprise hundreds or thousands of satellites 1402, in various orbits 1404. For example, one or more of these satellites 1402 may be in non-geosynchronous orbits (NGOs) in which they are in constant motion with respect to the Earth. For example, orbit 1404 is a low earth orbit (LEO). In this illustration, orbit 1404 is depicted with an arc pointed to the right. A first satellite (SAT1) 1402(1) is leading (ahead of) a second satellite (SAT2) 1402(2) in the orbit 1404.

Satellite 1402 may comprise a structural system 1420, a control system 1422, a power system 1424, a maneuvering system 1426, and a communication system 1428 described herein. In other implementations, some systems may be omitted, or other systems added. One or more of these systems may be communicatively coupled with one another in various combinations.

The structural system 1420 comprises one or more structural elements to support the operation of satellite 1402. For example, the structural system 1420 may include trusses, struts, panels, and so forth. The components of other systems may be affixed to, or housed by, the structural system 1420. For example, the structural system 1420 may provide mechanical mounting and support for solar panels in the power system 1424. The structural system 1420 may also provide thermal control to maintain components of the satellite 1402 within operational temperature ranges. For example, the structural system 1420 may include louvers, heat sinks, radiators, and so forth.

The control system 1422 provides various services, such as operating the onboard systems, resource management, providing telemetry, processing commands, and so forth. For example, the control system 1422 may direct the operation of the communication system 1428.

The power system 1424 provides electrical power for the operation of the components onboard satellite 1402. The power system 1424 may include components to generate electrical energy. For example, the power system 1424 may comprise one or more photovoltaic cells, thermoelectric devices, fuel cells, and so forth. The power system 1424 may include components to store electrical energy. For example, the power system 1424 may comprise one or more batteries, fuel cells, and so forth.

The maneuvering system 1426 maintains the satellite 1402 in one or more of a specified orientation or orbit 1404. For example, the maneuvering system 1426 may stabilize satellite 1402 with respect to one or more axis. In another example, the maneuvering system 1426 may move the satellite 1402 to a specified orbit 1404. The maneuvering system 1426 may include one or more computing devices, sensors, thrusters, momentum wheels, solar sails, drag devices, and so forth. For example, the sensors of the maneuvering system 1426 may include one or more global navigation satellite system (GNSS) receivers, such as global positioning system (GPS) receivers, to provide information about the position and orientation of satellite 1402 relative to Earth. In another example, the sensors of the maneuvering system 1426 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 1428 provides communication with one or more other devices, such as other satellites 1402, ground stations 1406, user terminals 1408, and so forth. The communication system 1428 may include one or more modems, digital signal processors, power amplifiers, antennas (including at least one antenna that implements multiple antenna elements, such as a phased array antenna, and including an embedded calibration antenna, such as the calibration antenna as described herein), processors, memories, storage devices, communications peripherals, interface buses, and so forth. Such components support communications with other satellites 1402, ground stations 1406, user terminals 1408, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1428 may be output to other systems, such as to the control system 1422, for further processing. Output from a system, such as the control system 1422, may be provided to the communication system 1428 for transmission.

One or more ground stations 1406 are in communication with one or more satellites 1402. The ground stations 1406 may pass data between the satellites 1402, a management system 1450, networks such as the Internet, and so forth. The ground stations 1406 may be emplaced on land, on vehicles, at sea, and so forth. Each ground station 1406 may comprise a communication system 1440. Each ground station 1406 may use the communication system 1440 to establish communication with one or more satellites 1402, other ground stations 1406, and so forth. The ground station 1406 may also be connected to one or more communication networks. For example, the ground station 1406 may connect to a terrestrial fiber optic communication network. The ground station 1406 may act as a network gateway, passing user data 1412 or other data between the one or more communication networks and the satellites 1402. Such data may be processed by the ground station 1406 and communicated via the communication system 1440. The communication system 1440 of a ground station may include components similar to those of the communication system 1428 of a satellite 1402 and may perform similar communication functionalities. For example, the communication system 1440 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 1406 are in communication with a management system 1450. The management system 1450 is also in communication, via the ground stations 1406, with the satellites 1402 and the UTs 1408. The management system 1450 coordinates the operation of the satellites 1402, ground stations 1406, UTs 1408, and other resources of the communication system 1400. The management system 1450 may comprise one or more of an orbital mechanics system 1452 or a scheduling system 1456. In some embodiments, the scheduling system 1456 can operate in conjunction with an HD controller.

The orbital mechanics system 1452 determines orbital data 1454 that is indicative of a state of a particular satellite 1402 at a specified time. In one implementation, the orbital mechanics system 1452 may use orbital elements that represent characteristics of the orbit 1404 of the satellites 1402 in the constellation to determine the orbital data 1454 that predicts location, velocity, and so forth of particular satellites 1402 at particular times or time intervals. For example, the orbital mechanics system 1452 may use data obtained from actual observations from tracking stations, data from the satellites 1402, scheduled maneuvers, and so forth to determine the orbital elements. The orbital mechanics system 1452 may also consider other data, such as space weather, collision mitigation, orbital elements of known debris, and so forth.

The scheduling system 1456 schedules resources to provide communication to the UTs 1408. For example, the scheduling system 1456 may determine handover data that indicates when communication is to be transferred from the first satellite 1402(1) to the second satellite 1402(2). Continuing the example, the scheduling system 1456 may also specify communication parameters such as frequency, timeslot, and so forth. During operation, the scheduling system 1456 may use information such as the orbital data 1454, system status data 1458, user terminal data 1460, and so forth.

The system status data 1458 may comprise information such as which UTs 1408 are currently transferring data, satellite availability, current satellites 1402 in use by respective UTs 1408, capacity available at particular ground stations 1406, and so forth. For example, the satellite availability may comprise information indicative of satellites 1402 that are available to provide communication service or those satellites 1402 that are unavailable for communication service. Continuing the example, a satellite 1402 may be unavailable due to malfunction, previous tasking, maneuvering, and so forth. The system status data 1458 may be indicative of past status, predictions of future status, and so forth. For example, the system status data 1458 may include information such as projected data traffic for a specified interval of time based on previous transfers of user data 1412. In another example, the system status data 1458 may be indicative of future status, such as a satellite 1402 being unavailable to provide communication service due to scheduled maneuvering, scheduled maintenance, scheduled decommissioning, and so forth.

The user terminal data 1460 may comprise information such as a location of a particular UT 1408. The user terminal data 1460 may also include other information such as a priority assigned to user data 1412 associated with that UT 1408, information about the communication capabilities of that particular UT 1408, and so forth. For example, a particular UT 1408 in use by a business may be assigned a higher priority relative to a UT 1408 operated in a residential setting. Over time, different versions of UTs 1408 may be deployed, having different communication capabilities such as being able to operate at particular frequencies, supporting different signal encoding schemes, having different antenna configurations, and so forth.

The UT 1408 includes a communication system 1480 to establish communication with one or more satellites 1402. The communication system 1480 of the UT 1408 may include components similar to those of the communication system 1428 of a satellite 1402 and may perform similar communication functionalities. For example, the communication system 1480 may include one or more modems, digital signal processors, power amplifiers, antennas (including at least one antenna that implements multiple antenna elements, such as a phased array antenna), processors, memories, storage devices, communications peripherals, interface buses, and so forth. The UT 1408 passes user data 1412 between the constellation of satellites 1402 and the user device 1410. The user data 1412 includes data originated by the user device 1410 or addressed to the user device 1410. The UT 1408 may be fixed or in motion. For example, the UT 1408 may be used at a residence, or on a vehicle such as a car, boat, aerostat, drone, airplane, and so forth.

The UT 1408 includes a tracking system 1482. The tracking system 1482 uses almanac data 1484 to determine tracking data 1486. The almanac data 1484 provides information indicative of orbital elements of the orbit 1404 of one or more satellites 1402. For example, the almanac data 1484 may comprise orbital elements such as "two-line element" data for the satellites 1402 in the constellation that are broadcast or otherwise sent to the UTs 1408 using the communication system 1480.

The tracking system 1482 may use the current location of the UT 1408 and the almanac data 1484 to determine the tracking data 1486 for satellite 1402. For example, based on the current location of the UT 1408 and the predicted position and movement of the satellites 1402, the tracking system 1482 is able to calculate the tracking data 1486. The tracking data 1486 may include information indicative of azimuth, elevation, distance to the second satellite, time of flight correction, or other information at a specified time. The determination of the tracking data 1486 may be ongoing. For example, the first UT 1408 may determine tracking data 1486 every 700 ms, every second, every five seconds, or at other intervals.

With regard to FIG. 14, an uplink is a communication link which allows data to be sent to satellite 1402 from a ground station 1406, UT 1408, or device other than another satellite 1402. Uplinks are designated as UL1, UL2, UL3, and so forth. For example, UL1 is a first uplink from the ground station 1406 to the second satellite 1402(2). In comparison, a downlink is a communication link which allows data to be sent from satellite 1402 to a ground station 1406, UT 1408, or device other than another satellite 1402. For example, DL1 is a first downlink from the second satellite 1402(2) to the ground station 1406. The satellites 1402 may also be in communication with one another. For example, a crosslink 1490 provides for communication between satellites 1402 in the constellation.

The satellite 1402, the ground station 1406, the user terminal 1408, the user device 1410, the management system 1450, or other systems described herein may include one or more computing devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control the operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 15:
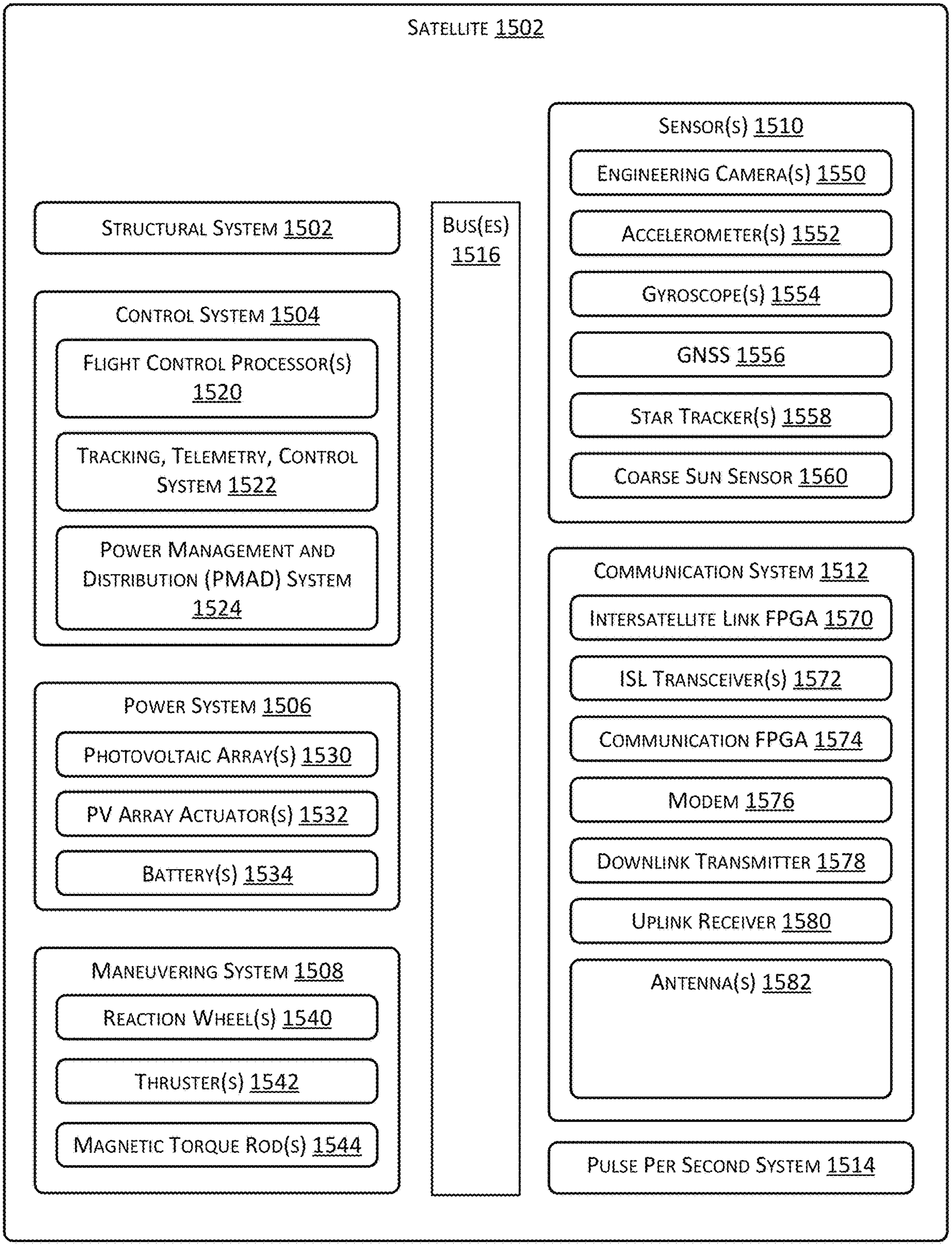
FIG. 15 is a functional block diagram of some systems associated with the satellite, according to some implementations.

FIG. 15 is a functional block diagram of some systems associated with satellite 1402, according to some implementations. The satellite 1402 may comprise a structural system 1502, a control system 1504, a power system 1506, a maneuvering system 1508, one or more sensors 1510, and a communication system 1512. A pulse per second (PPS) system 1514 may be used to provide a timing reference to the systems onboard satellite 1402. One or more busses 1516 may be used to transfer data between the systems onboard satellite 1402. In some implementations, redundant busses 1516 may be provided. The busses 1516 may include, but are not limited to, data busses such as Controller Area Network Flexible Data Rate (CAN FD), Ethernet, Serial Peripheral Interface (SPI), and so forth. In some implementations, the busses 1516 may carry other signals. For example, a radio frequency bus may comprise coaxial cable, waveguides, and so forth to transfer radio signals from one part of the satellite 1402 to another. In other implementations, some systems may be omitted or other systems added. One or more of these systems may be communicatively coupled with one another in various combinations.

The structural system 1502 comprises one or more structural elements to support the operation of satellite 1402. For example, the structural system 1502 may include trusses, struts, panels, and so forth. The components of other systems may be affixed to, or housed by, the structural system 1502. For example, the structural system 1502 may provide mechanical mounting and support for solar panels in the power system 1506. The structural system 1502 may also provide for thermal control to maintain components of the satellite 1402 within operational temperature ranges. For example, the structural system 1502 may include louvers, heat sinks, radiators, and so forth.

The control system 1504 provides various services, such as operating the onboard systems, resource management, providing telemetry, processing commands, and so forth. For example, the control system 1504 may direct the operation of the communication system 1512. The control system 1504 may include one or more flight control processors 1520. The flight control processors 1520 may comprise one or more processors, FPGAs, and so forth. A tracking, telemetry, and control (TTC) system 1522 may include one or more processors, radios, and so forth. For example, the TTC system 1522 may comprise a dedicated radio transmitter and receiver to receive commands from a ground station 1406, send telemetry to the ground station 1406, and so forth. Power management and distribution (PMAD) system 1524 may direct operation of the power system 1506, control distribution of power to the systems of the satellite 1402, control battery 1534 charging, and so forth.

The power system 1506 provides electrical power for the operation of the components onboard the satellite 1402. The power system 1506 may include components to generate electrical energy. For example, the power system 1506 may comprise one or more photovoltaic arrays 1530 comprising a plurality of photovoltaic cells, thermoelectric devices, fuel cells, and so forth. One or more PV array actuators 1532 may be used to change the orientation of the photovoltaic array(s) 1530 relative to the satellite 1402. For example, the PV array actuator 1532 may comprise a motor. The power system 1506 may include components to store electrical energy. For example, the power system 1506 may comprise one or more batteries 1534, fuel cells, and so forth.

The maneuvering system 1508 maintains the satellite 1402 in one or more of a specified orientation or orbit 1404. For example, the maneuvering system 1508 may stabilize satellite 1402 with respect to one or more axes. In another example, the maneuvering system 1508 may move the satellite 1402 to a specified orbit 1404. The maneuvering system 1508 may include one or more of reaction wheel(s) 1540, thrusters 1542, magnetic torque rods 1544, solar sails, drag devices, and so forth. The thrusters 1542 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 1506 to expel the water and produce thrust. During operation, the maneuvering system 1508 may use data obtained from one or more of the sensors 1510.

Satellite 1402 includes one or more sensors 1510. The sensors 1510 may include one or more engineering cameras 1550. For example, an engineering camera 1550 may be mounted on satellite 1402 to provide images of at least a portion of the photovoltaic array 1530. Accelerometers 1552 provide information about the acceleration of satellite 1402 along one or more axes. Gyroscopes 1554 provide information about the rotation of satellite 1402 with respect to one or more axes. The sensors 1510 may include a global navigation satellite system (GNSS) 1556 receiver, such as Global Positioning System (GPS) receiver, to provide information about the position of the satellite 1402 relative to Earth. In some implementations, the GNSS 1556 may also provide information indicative of velocity, orientation, and so forth. One or more star trackers 1558 may be used to determine an orientation of satellite 1402. A coarse sun sensor 1560 may be used to detect the sun, provide information on the relative position of the sun with respect to satellite 1402, and so forth. The satellite 1402 may include other sensors 1510 as well. For example, satellite 1402 may include a horizon detector, radar, LIDAR, and so forth.

The communication system 1512 provides communication with one or more other devices, such as other satellites 1402, ground stations 1406, user terminals 1408, and so forth. The communication system 1512 may include one or more modems 1576, digital signal processors, power amplifiers, antennas 1582 (including at least one antenna that implements multiple antenna elements, such as a phased array antenna such as the antenna elements 104 of FIG. 1), processors, memories, storage devices, communications peripherals, interface buses, and so forth. Such components support communications with other satellites 1402, ground stations 1406, user terminals 1408, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1512 may be output to other systems, such as to the control system 1504, for further processing. Output from a system, such as the control system 1504, may be provided to the communication system 1512 for transmission.

The communication system 1512 may include hardware to support the intersatellite link 1490. For example, an intersatellite link FPGA 1570 may be used to modulate data that is sent and received by an ISL transceiver 1572 to send data between satellites 1402. The ISL transceiver 1572 may operate using radio frequencies, optical frequencies, and so forth.

A communication FPGA 1574 may be used to facilitate communication between satellite 1402 and the ground stations 1406, UTs 1408, and so forth. For example, the communication FPGA 1574 may direct the operation of a modem 1576 to modulate signals sent using a downlink transmitter 1578 and demodulate signals received using an uplink receiver 1580. The satellite 1402 may include one or more antennas 1582. For example, one or more parabolic antennas may be used to provide communication between satellite 1402 and one or more ground stations 1406. In another example, a phased array antenna may be used to provide communication between satellite 1402 and the UTs 1408.

Figure 16:
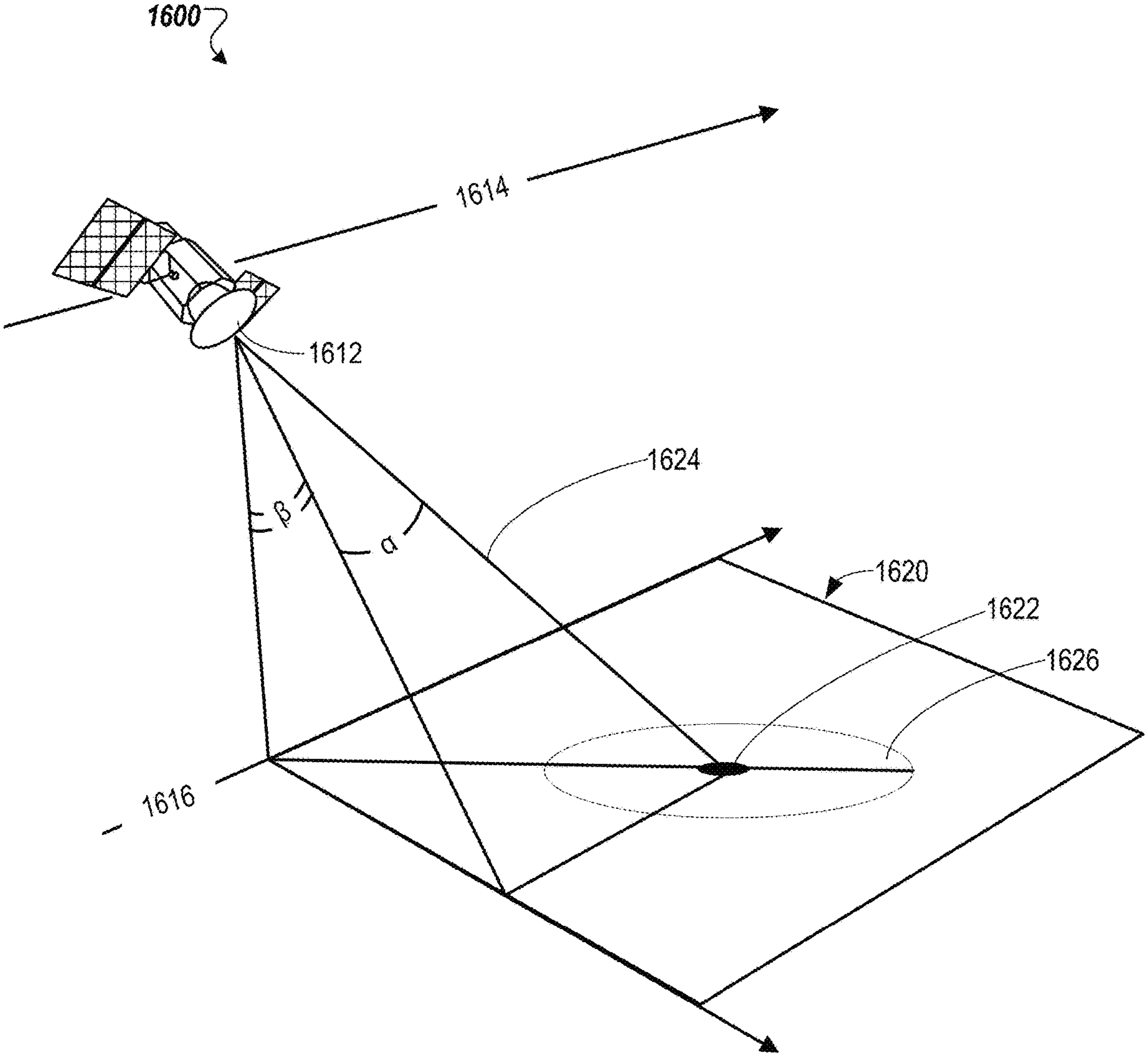
FIG. 16 illustrates a satellite including an antenna system that is steerable, according to embodiments of the present disclosure.

FIG. 16 illustrates the satellite 1600 including an antenna system 1612 that is steerable according to embodiments of the present disclosure. The satellite 1600 can include the communication system with the antennas of FIGS. 1-13. The antenna system 1612 may include multiple antenna elements that form an antenna and that can be mechanically or electrically steered individually, collectively, or a combination thereof. In an example, the antenna is a phased array antenna.

In orbit 1404, the satellite 1600 follows a path 1614, the projection of which onto the surface of the Earth forms a ground path 1616. In the example illustrated in FIG. 16, the ground path 1616 and a projected axis extending orthogonally from the ground path 1616 at the position of the satellite 1600, together define a region 1620 of the surface of the Earth. In this example, the satellite 1600 is capable of establishing uplink and downlink communications with one or more of ground stations, user terminals, or other devices within region 1620. In some embodiments, region 1620 may be located in a different relative position to the ground path 1616 and the position of the satellite 1600. For example, region 1620 may describe a region of the surface of the Earth directly below satellite 1600. Furthermore, embodiments may include communications between the satellite 1600, an airborne communications system, and so forth.

As shown in FIG. 16, a communication target 1622 (e.g., a ground station, a user terminal, or a CT (such as an HD CT)) is located within region 1620. The satellite 1600 controls the antenna system 1612 to steer transmission and reception of communications signals to selectively communicate with the communication target 1622. For example, in a downlink transmission from satellite 1600 to the communication target 1622, a signal beam 1624 emitted by the antenna system 1612 is steerable within an area 1626 of the region 1620. In some implementations, the signal beam 1624 may include multiple subbeams. The extents of the area 1626 define an angular range within which the signal beam 1624 is steerable, where the direction of the signal beam 1624 is described by a beam angle "a" relative to a surface normal vector of the antenna system 1612. In two-dimensional phased array antennas, the signal beam 1624 is steerable in two dimensions, described in FIG. 16 by a second angle "β" orthogonal to the beam angle α. In this way, area 1626 is a two-dimensional area within the region 1620, rather than a linear track at a fixed angle determined by the orientation of the antenna system 1612 relative to the ground path 1616.

In FIG. 16, as the satellite 1600 follows the path 1614, the area 1626 tracks along the surface of the Earth. In this way, the communication target 1622, which is shown centered in the area 1626 for clarity, is within the angular range of the antenna system 1612 for a period of time. During that time, signals communicated between satellite 1600 and the communication target 1622 are subject to bandwidth constraints, including but not limited to signal strength and calibration of the signal beam 1624. In an example, for phased array antenna systems, the signal beam 1624 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 17:
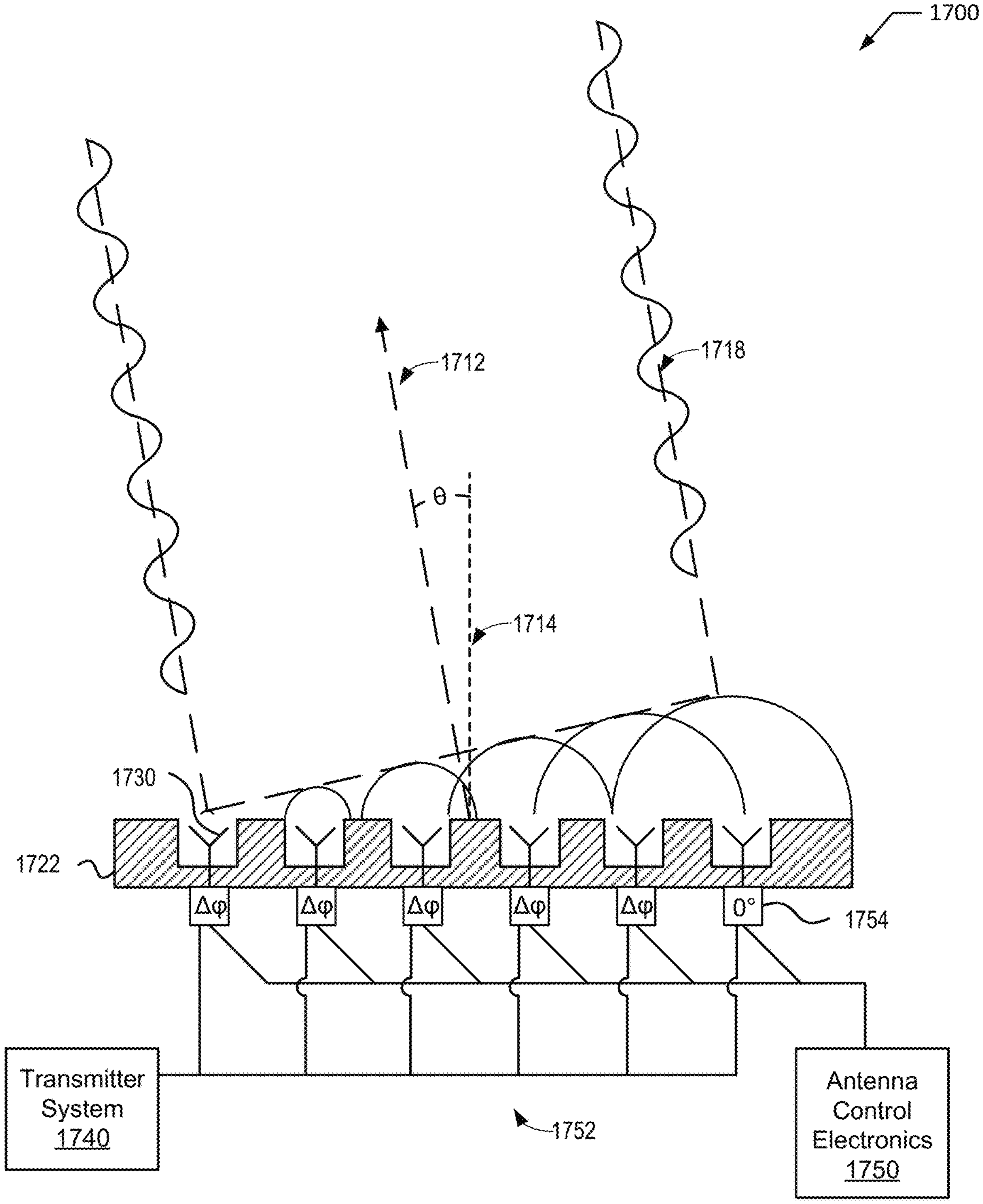
FIG. 17 illustrates a simplified schematic of an antenna, according to embodiments of the present disclosure.

FIG. 17 illustrates a simplified schematic of an antenna 1700, according to embodiments of the present disclosure. The antenna 1700 may be a component of the antenna system 1612 of FIG. 16. As illustrated, the antenna 1700 is a phased array antenna that includes multiple antenna elements 1730 (e.g. antenna elements in FIG. 1). Interference between the antenna elements 1730 forms a directional radiation pattern in both transmitter and receiver arrays forming a beam 1710 (beam extents shown as dashed lines). The beam 1710 is a portion of a larger transmission pattern (not shown) that extends beyond the immediate vicinity of the antenna 1700. The beam 1710 is directed along a beam vector 1712, described by an angle "θ" relative to an axis 1714 normal to a surface of the antenna 1700. As described below, beam 1710 is one or more of steerable or shapeable through control of operating parameters including, but not limited to a phase and an amplitude of each antenna element 1730.

In FIG. 17, the antenna 1700 includes, within a transmitter section 1722, the antenna elements 1730, which may include but are not limited to, omnidirectional transmitter antennas coupled to a transmitter system 1740, such as the downlink transmitter 1578. The transmitter system 1740 provides a signal, such as a downlink signal to be transmitted to a ground station on the surface. The downlink signal is provided to each antenna element 1730 as a time-varying signal that may include several multiplexed signals. To steer the beam 1710 relative to the axis 1714, the phased array antenna system includes antenna control electronics 1750 controlling a radio frequency (RF) feeding network 1752, including multiple signal conditioning components 1754 interposed between the antenna elements 1730 and the transmitter system 1740. The signal conditioning components 1754 introduce one or more of a phase modulation or an amplitude modulation (e.g. by phase shifters), as denoted by "Δφ" in FIG. 17, to the signal sent to the antenna elements 1730. As shown in FIG. 17, introducing a progressive phase modulation produces interference in the individual transmission of each antenna element 1730 that generates the beam 1710.

The phase modulation imposed on each antenna element 1730 can differ and can be dependent on a spatial location of a communication target that determines an optimum beam vector (e.g., where the beam vector 1712 is found by one or more of maximizing signal intensity or connection strength). The optimum beam vector may change with time as the communication target 1622 moves relative to the phased array antenna system.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:

a support structure;

a first plurality of antenna elements disposed on a first plane of the support structure, wherein two adjacent antenna elements of the first plurality of antenna elements are separated by a first distance;

a second plurality of antenna elements disposed on a second plane of the support structure, wherein two adjacent elements of the second plurality of antenna elements are separated by a second distance that is less than the first distance; and a plurality of parasitic antenna elements disposed on the first plane of the support structure, wherein:

a first element of the two adjacent elements of the second plurality of antenna elements is disposed above a first element of the first plurality of antenna elements; and a second element of the two adjacent elements of the second plurality of antenna elements is disposed above a first parasitic antenna element of the plurality of parasitic antenna elements.

2. The apparatus of claim 1, wherein the first element of the two adjacent elements of the second plurality of antenna elements and the first element of the first plurality of antenna elements are centered relative to one another.

3. The apparatus of claim 2, further comprising:

a first feed coupled to the first element of the two adjacent elements of the second plurality of antenna elements in a first layer through at least a second layer comprising the first element of the first plurality of antenna elements;

a stub coupled to the first feed; and a second feed coupled to the first element of the first plurality of antenna elements.

4. The apparatus of claim 1, further comprising:

a first feed coupled to the first element of the two adjacent elements of the second plurality of antenna elements in a first layer through at least a second layer comprising the first element of the first plurality of antenna elements; and a second feed coupled to the first element of the first plurality of antenna elements, wherein the first element of the two adjacent elements of the second plurality of antenna elements is staggered relative to the first element of the first plurality of antenna elements on a side closer to the second feed than the first feed.

5. The apparatus of claim 1, further comprising:

a first feed coupled to the first element of the two adjacent elements of the second plurality of antenna elements in a first layer through at least a second layer comprising the first element of the first plurality of antenna elements; and a second feed coupled to the first element of the first plurality of antenna elements, wherein the first element of the two adjacent elements of the second plurality of antenna elements is staggered relative to the first element of the first plurality of antenna elements on a side closer to the first feed than the second feed.

6. The apparatus of claim 5, further comprising a stub coupled to the second feed.

7. The apparatus of claim 1, wherein the first plurality of antenna elements is configured to operate in a first frequency range, wherein the second plurality of antenna elements is configured to operate in a second frequency range higher than the first frequency range, and wherein each of the first plurality of antenna elements and the plurality of parasitic antenna elements has a first size and each of the second plurality of antenna elements has a second size that is smaller than the first size.

8. A wireless device comprising:

a support structure;

a first radio;

a second radio;

a first antenna coupled to the first radio, the first antenna comprising i) a first plurality of antenna elements disposed on a first plane of the support structure and ii) a plurality of parasitic antenna elements disposed on the first plane, wherein two adjacent antenna elements of the first plurality of antenna elements are separated by a first distance; and a second antenna coupled to the second radio, the second antenna comprising a second plurality of antenna elements disposed on a second plane of the support structure, wherein two adjacent elements of the second plurality of antenna elements are separated by a second distance that is less than the first distance, wherein:

a first element of the two adjacent elements of the second plurality of antenna elements is disposed above a first element of the first plurality of antenna elements; and a second element of the two adjacent elements of the second plurality of antenna elements is disposed above a first parasitic antenna element of the plurality of parasitic antenna elements.

9. The wireless device of claim 8, wherein the first element of the two adjacent elements of the second plurality of antenna elements and the first element of the first plurality of antenna elements are centered relative to one another.

10. The wireless device of claim 9, further comprising:

a first feed coupled to the first element of the two adjacent elements of the second plurality of antenna elements in a first layer through at least a second layer comprising the first element of the first plurality of antenna elements;

a stub coupled to the first feed; and a second feed coupled to the first element of the first plurality of antenna elements.

11. The wireless device of claim 8, further comprising:

a first feed coupled to the first element of the two adjacent elements of the second plurality of antenna elements in a first layer through at least a second layer comprising the first element of the first plurality of antenna elements; and a second feed coupled to the first element of the first plurality of antenna elements, wherein the first element of the two adjacent elements of the second plurality of antenna elements is staggered relative to the first element of the first plurality of antenna elements on a side closer to the second feed than the first feed.

12. The wireless device of claim 8, further comprising:

a first feed coupled to the first element of the two adjacent elements of the second plurality of antenna elements in a first layer through at least a second layer comprising the first element of the first plurality of antenna elements; and a second feed coupled to the first element of the first plurality of antenna elements, wherein the first element of the two adjacent elements of the second plurality of antenna elements is staggered relative to the first element of the first plurality of antenna elements on a side closer to the first feed than the second feed.

13. The wireless device of claim 12, further comprising a stub coupled to the second feed.

14. The wireless device of claim 8, wherein the first plurality of antenna elements is configured to operate in a first frequency range, wherein the second plurality of antenna elements is configured to operate in a second frequency range higher than the first frequency range, and wherein each of the first plurality of antenna elements and the plurality of parasitic antenna elements has a first size and each of the second plurality of antenna elements has a second size that is smaller than the first size.

15. A wireless device comprising:

a support structure;

a first radio that operates in a first frequency band;

a second radio that operates in a second frequency band, the first frequency band being lower in frequency than the second frequency band;

a first phased array antenna comprising i) a first plurality of antenna elements coupled to the first radio and ii) a plurality of parasitic antenna elements; and a second phased array antenna coupled to the second radio, the second phased array antenna comprising (i) a second plurality of antenna elements coupled to the second radio, wherein:

two adjacent antenna elements of the first plurality of antenna elements are separated by a first distance; and two adjacent antenna elements of the second plurality of antenna elements are separated by a second distance, the second distance being less than the first distance;

a first element of the two adjacent antenna elements of the second plurality of antenna elements is disposed above a first element of the first plurality of antenna elements; and a second element of the two adjacent antenna elements of the second plurality of antenna elements is disposed above a first parasitic antenna element of the plurality of parasitic antenna elements.

16. The wireless device of claim 15, wherein the first element of the two adjacent elements of the second plurality of antenna elements and the first element of the first plurality of antenna elements are centered relative to one another.

17. The wireless device of claim 16, further comprising:

a first feed coupled to the first element of the two adjacent elements of the second plurality of antenna elements in a first layer through at least a second layer comprising the first element of the first plurality of antenna elements;

a stub coupled to the first feed; and a second feed coupled to the first element of the first plurality of antenna elements.

18. The wireless device of claim 15, further comprising:

a first feed coupled to the first element of the two adjacent elements of the second plurality of antenna elements in a first layer through at least a second layer comprising the first element of the first plurality of antenna elements; and a second feed coupled to the first element of the first plurality of antenna elements, wherein the first element of the two adjacent elements of the second plurality of antenna elements is staggered relative to the first element of the first plurality of antenna elements on a side closer to the second feed than the first feed.

19. The wireless device of claim 15, further comprising:

a first feed coupled to the first element of the two adjacent elements of the second plurality of antenna elements in a first layer through at least a second layer comprising the first element of the first plurality of antenna elements; and a second feed coupled to the first element of the first plurality of antenna elements, wherein the first element of the two adjacent elements of the second plurality of antenna elements is staggered relative to the first element of the first plurality of antenna elements on a side closer to the first feed than the second feed.

20. The wireless device of claim 19, further comprising a stub coupled to the second feed.

* * * * *